United States Patent
Kida et al.

(10) Patent No.: US 9,718,973 B2
(45) Date of Patent: Aug. 1, 2017

(54) ULTRAVIOLET CURABLE COMPOSITION AND STORAGE BODY

(71) Applicant: Seiko Epson Corporation, Tokyo (JP)

(72) Inventors: Hiroaki Kida, Shiojiri (JP); Tetsuya Aoyama, Shiojiri (JP); Keitaro Nakano, Matsumoto (JP); Hitoshi Tsuchiya, Chino (JP); Toshiyuki Yoda, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/643,108

(22) Filed: Mar. 10, 2015

(65) Prior Publication Data

US 2015/0259549 A1 Sep. 17, 2015

(30) Foreign Application Priority Data

Mar. 11, 2014 (JP) ................ 2014-048222
Mar. 11, 2014 (JP) ................ 2014-048223
Apr. 14, 2014 (JP) ................ 2014-083130

(51) Int. Cl.
*C09D 11/101* (2014.01)
*C09D 11/322* (2014.01)
*C09D 11/38* (2014.01)

(52) U.S. Cl.
CPC .......... *C09D 11/101* (2013.01); *C09D 11/322* (2013.01); *C09D 11/38* (2013.01); *B65D 2565/388* (2013.01); *Y10T 428/1379* (2015.01)

(58) Field of Classification Search
CPC ...... C09D 11/101; C09D 11/322; C09D 11/38
See application file for complete search history.

(56) References Cited

U.S. PATENT DOCUMENTS

2008/0134935 A1* 6/2008 Kunimine ............ C09D 11/322
106/31.85
2010/0133728 A1 6/2010 Yonezawa et al.
2010/0261103 A1* 10/2010 Sasaki .................... B82Y 30/00
430/7

(Continued)

FOREIGN PATENT DOCUMENTS

JP 2003-213184 A 7/2003
JP 2005-200560 A 7/2005

(Continued)

OTHER PUBLICATIONS

Fujii, MachineTranslationofJP2013163740A, 2013.*
Fujii, MachineTranslationofWO/2013/118766 (App # PCT-JP-2013-052712), 2013.*

*Primary Examiner* — Geoffrey Mruk
*Assistant Examiner* — Scott A Richmond
(74) *Attorney, Agent, or Firm* — Harness, Dickey & Pierce, P.L.C.

(57) ABSTRACT

An ultraviolet curable composition includes a polymerizable compound and is stored in a storage body, in which an amount of water is greater than or equal to 0.05 mass % and less than or equal to 1.0 mass % with respect to a total amount of the ultraviolet curable composition, a content of at least one metal element selected from a group consisting of Li, Na, K, Ag, Mg, Ca, Ba, Zn, Fe, Sn, Al, and Zr is greater than or equal to 10 ppm by mass, and a content of each metal element included in the group is less than or equal to 250 ppm by mass.

1 Claim, 1 Drawing Sheet

(56) References Cited

U.S. PATENT DOCUMENTS

| | | | | |
|---|---|---|---|---|
| 2012/0113201 A1* | 5/2012 | Kagose | ................... | C09D 4/00 |
| | | | | 347/102 |
| 2014/0132682 A1* | 5/2014 | Kida | ..................... | C09D 11/38 |
| | | | | 347/100 |
| 2014/0370250 A1* | 12/2014 | Fujii | ..................... | C08F 283/12 |
| | | | | 428/195.1 |
| 2015/0217573 A1* | 8/2015 | Gonzalez | ............ | B41J 2/17509 |
| | | | | 347/85 |

FOREIGN PATENT DOCUMENTS

| | | | |
|---|---|---|---|
| JP | 2010-157706 A | 7/2010 | |
| JP | 2011-500932 A | 1/2011 | |
| JP | 2012-167161 A | 9/2012 | |
| JP | 2012-171249 A | 9/2012 | |
| WO | WO-2009-053348 A1 | 4/2009 | |
| WO | WO2013118766 A * | 8/2013 | ............. C09D 11/00 |
| WO | WO 2014084825 A1 * | 6/2014 | .......... B41J 2/17509 |

* cited by examiner

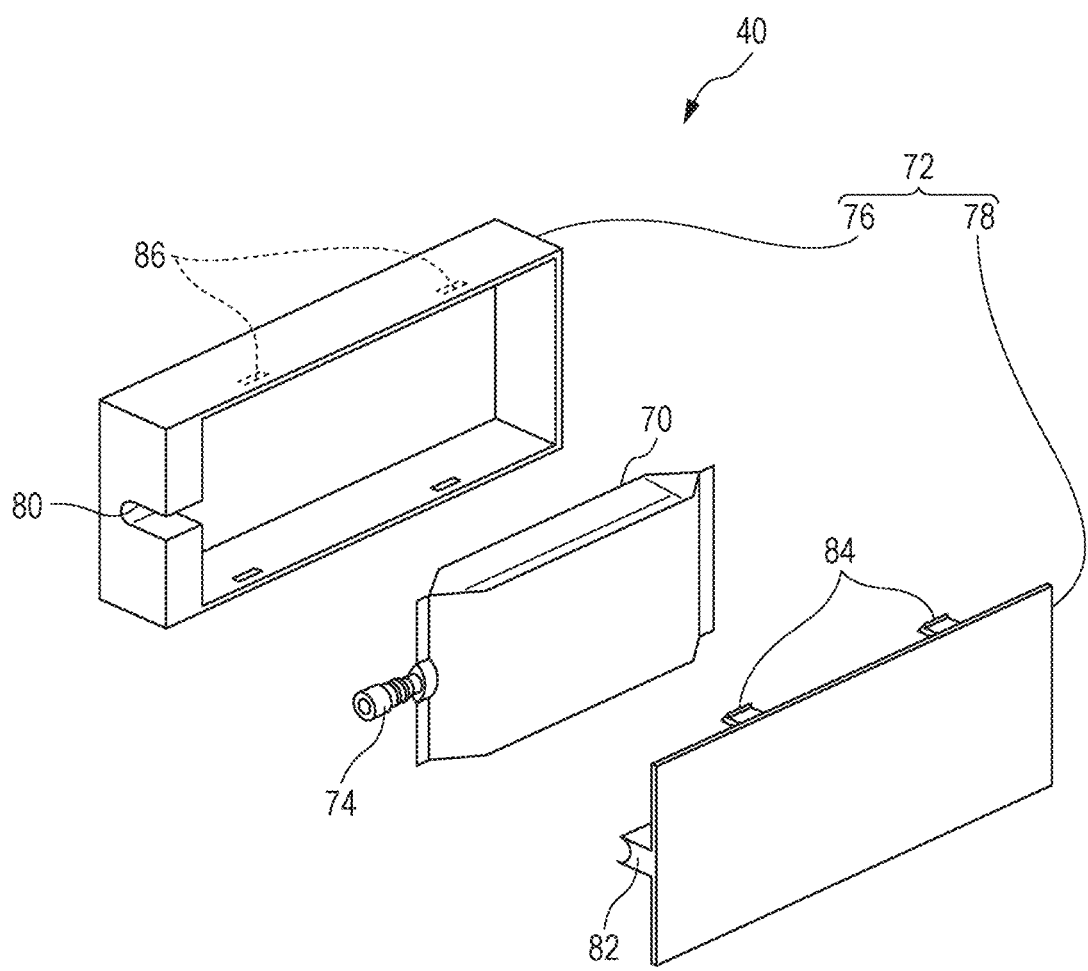

ULTRAVIOLET CURABLE COMPOSITION AND STORAGE BODY

BACKGROUND

1. Technical Field

The present invention relates to an ultraviolet curable composition and a storage body.

2. Related Art

An ink jet recording method is able to record a high resolution image by a comparatively simple device and has made rapid development in various fields. Among them, an ink composition used in an ink jet recording method in which ink is cured by ultraviolet irradiation is variously considered. For example, in JP-A-2005-200560, in order to provide ultraviolet curable ink jet ink which is able to be discharged with excellent stability and impact accuracy, and has excellent preserving properties and curing properties, ultraviolet curable ink jet ink including at least a pigment, a dispersing agent in which an acid value is greater than an amine value, a polymerizable compound, and a photopolymerization initiator is disclosed in which a total amount of cationic impurities, metal impurities, and a highly acidic substance is less than or equal to 500 ppm.

Further, in JP-A-2005-200560, in order to provide an ink jet recording method which is inexpensive and is suitable for printing, and has excellent aging variation in concentration, bleeding, uneven infiltration, bending resistance, cockling, wrinkling resistance, and jetting properties, an ink jet recording method is disclosed in which recording is performed with respect to a high ink absorptive paper-based recording medium where a moisture content is greater than or equal to 0 mass % and less than or equal to 5 mass %, and an amount of water A (g/m$^2$) which is converted into a value per 1 m$^2$ is adjusted to satisfy a specific condition by using ink having surface tension greater than or equal to 20 mN/m and less than or equal to 35 mN/m which is cured by a cationic polymerization reaction using active energy rays.

However, when an amount of impurities in an ultraviolet curable composition disclosed in JPA-2005-200560 simply decreases, curing properties of the composition decreases. On the other hand, there is a demand for suppressing precipitation of a foreign substance in the composition, and for this reason, it is considered that the amount of water in the ultraviolet curable composition decreases to a maximum extent. However, when the amount of water excessively decreases, in particular, excessive processes or time is required for eliminating moisture from a polymerizable compound, and thus efficiency in manufacturing the ultraviolet curable composition decreases.

In addition, in the ink jet recording method disclosed in JP-A-2005-200560, moisture is eliminated from the ink to a maximum extent in order to attain a predetermined object. In particular, the ink which is cured by the cationic polymerization reaction is used, and thus moisture considerably affecting curing properties decreases to a maximum extent. However, when a polymerizable compound having a high curing speed is used, it is difficult to make curing properties and preservation stability compatible at a high level.

SUMMARY

An advantage of some aspects of the invention is to provide an ultraviolet curable composition which has excellent curing properties and high manufacturing efficiency thereof, and is able to suppress precipitation of a foreign substance, and a storage body which is filled with the composition.

In addition, another advantage of some aspects of the invention is to provide an ultraviolet curable ink jet composition capable of making curing properties and preservation stability compatible at a high level, a storage body storing the composition, and an ink jet recording method using the composition.

The present inventors have studied intensively in order to solve the problem described above. As a result thereof, it is found that the problem described above is able to be solved by including a predetermined amount of a specific metal element together with a polymerizable compound, and a predetermined amount of moisture in an ultraviolet curable composition, and thus the invention has been accomplished.

That is, a first aspect of the invention is as follows.

[1] An ultraviolet curable composition which includes a polymerizable compound and is stored in a storage body, in which an amount of water is greater than or equal to 0.05 mass % and less than or equal to 1.0 mass % with respect to a total amount of the ultraviolet curable composition, a content of at least one metal element selected from a group consisting of Li, Na, K, Ag, Mg, Ca, Ba, Zn, Fe, Sn, Al, and Zr is greater than or equal to 10 ppm by mass, and a content of each metal element included in the group is less than or equal to 250 ppm by mass.

[2] The ultraviolet curable composition according to [1], in which the ultraviolet curable composition is an ink jet composition.

[3] The ultraviolet curable composition according to [1] or [2], in which the ultraviolet curable composition includes at least one metal element in the form of at least one of metal ions and a metal salt.

[4] The ultraviolet curable composition according to any one of [1] to [3], in which the ultraviolet curable composition is a radical polymerizable ultraviolet curable composition.

[5] The ultraviolet curable composition according to any one of [1] to [4], in which the ultraviolet curable composition includes an acylphosphine oxide-based photopolymerization initiator.

[6] The ultraviolet curable composition according to any one of [1] to [5], in which the ultraviolet curable composition includes a polymerizable compound having a vinyl ether group as the polymerizable compound.

[7] The ultraviolet curable composition according to [6], in which the ultraviolet curable composition includes 10 mass % to 70 mass % of the polymerizable compound having a vinyl ether group with respect to the total amount of the ultraviolet curable composition.

[8] The ultraviolet curable composition according to [6] or [7], in which the ultraviolet curable composition includes a polymerizable compound denoted by the following formula (1) as the polymerizable compound having a vinyl ether group: CH$_2$=CR$^1$—COOR$^2$—O—CH=CH—R$^3$ . . . (1), and R$^1$ is a hydrogen atom or a methyl group, R$^2$ is a bivalent organic residue having 2 to 20 carbon atoms, and R$^3$ is a hydrogen atom or a univalent organic residue having 1 to 11 carbon atoms.

[9] The ultraviolet curable composition according to any one of [1] to [8], in which the number of metal elements of which a content is 10 ppm by mass to 250 ppm by mass with respect to the total amount of the ultraviolet curable composition among the metal elements included in the group is greater than or equal to three.

[10] A storage body storing the ultraviolet curable composition according to any one of [1] to [9].

[11] A storage body including a container including fatty acid ester as a plasticizing agent; and the ultraviolet curable composition according to any one of [1] to [9] which fills the inside of the container.

In addition, the present inventors have studied intensively in order to solve the problem described above. As a result thereof, it is found that the problem described above is able to be solved by using a specific polymerizable compound, and by making an amount of water in an ink composition fall within a predetermined range, and thus the invention has been accomplished.

That is, a second aspect of the invention is as follows.

[1] An ultraviolet curable ink jet composition which is stored in a storage body and includes a polymerizable compound having a vinyl ether group and a (meth)acryloyl group, in which an amount of water is greater than or equal to 0.05 mass % and less than or equal to 1.0 mass % with respect to a total amount of the composition.

[2] The ink jet composition according to [1], in which the ink jet composition is a radical polymerizable ultraviolet curable composition.

[3] The ink jet composition according to [1] or [2], in which the ink jet composition includes 3.0 mass % to 15 mass % of an acylphosphine oxide-based photopolymerization initiator with respect to the total amount of the composition.

[4] The ink jet composition according to any one of [1] to [3], in which the ink jet composition includes 10 mass % to 70 mass % of the polymerizable compound with respect to the total amount of the composition.

[5] The ink jet composition according to any one of [1] to [4], in which the ink jet composition includes a polymerizable compound denoted by the following formula (1) as the polymerizable compound: $CH_2=CR^1-COOR^2-O-CH=CH-R^3$ ... (1), and $R^1$ is a hydrogen atom or a methyl group, $R^2$ is a bivalent organic residue having 2 to 20 carbon atoms, and $R^3$ is a hydrogen atom or a univalent organic residue having 1 to 11 carbon atoms.

[6] The ink jet composition according to any one of [1] to [5], in which the ink jet composition further includes monofunctional (meth)acrylate having an aromatic ring.

[7] A storage body storing the ink jet composition according to any one of [1] to [6].

[8] A storage body including a container; and the composition according to any one of [1] to [6] which fills the inside of the container, in which a moisture vapor transmission rate of a member configuring the container is less than or equal to 30 $g/m^2 \cdot 24$ hrs under an environment of 40° C. and relative humidity of 90%.

[9] A storage body including a container; and the composition according to any one of [1] to [6] which fills the inside of the container, in which the storage body includes a sealing member which stores and seals at least the container, and a moisture vapor transmission rate of the sealing member is less than or equal to 30 $g/m^2 \cdot 24$ hrs under an environment of 40° C. and relative humidity of 90%.

[10] An ink jet method including attaching the ink jet composition according to any one of [1] to [6] to a discharge target.

[11] The ink jet method according to [10] further including curing the composition attached to the discharge target by irradiating the composition with light of which a light emitting peak wavelength is in a range of 360 nm to 420 nm using an ultraviolet light emitting diode.

BRIEF DESCRIPTION OF THE DRAWING

The invention will be described with reference to the accompanying drawing, wherein like numbers reference like elements.

FIG. 1 is an exploded perspective view illustrating an example of a storage body of the invention.

DESCRIPTION OF EXEMPLARY EMBODIMENTS

Hereinafter, embodiments (hereinafter, referred to as "this embodiment") of the first aspect of the invention will be described in detail with reference to the drawing, as necessary, but the invention is not limited thereto, and is able to be variously changed within a range without deviating from the gist. Furthermore, in the drawing, the same reference numerals are applied to the same constituents, and the repeated description thereof will be omitted. In addition, unless otherwise mentioned, a positional relationship such as up, down, right, and left is based on a positional relationship illustrated in the drawing. Further, a dimension ratio in the drawing is not limited to a ratio illustrated in the drawing. In addition, herein, "(meth)acryl" indicates "acryl" and "methacryl" corresponding thereto, and "(meth)acrylate" indicates "acrylate" and "methacrylate" corresponding thereto.

Ultraviolet Curable Composition

An ultraviolet curable composition of this embodiment includes a polymerizable compound, moisture, and at least one metal element selected from a group consisting of Li, Na, K, Ag, Mg, Ca, Ba, Zn, Fe, Sn, Al, and Zr, and is stored in a storage body. An amount of water included in the ultraviolet curable composition is greater than or equal to 0.05 mass % and less than or equal to 1.0 mass % with respect to a total amount of the ultraviolet curable composition. In addition, a content of at least one metal element (hereinafter, referred to as a "specific metal element") which is included in the ultraviolet curable composition and is selected from a group consisting of Li, Na, K, Ag, Mg, Ca, Ba, Zn, Fe, Sn, Al, and Zr is greater than or equal to 10 ppm by mass with respect to the total amount of the ultraviolet curable composition, and a content of each metal element included in the group described above is less than or equal to 250 ppm by mass. It is preferable that the ultraviolet curable composition is a radical polymerizable ultraviolet curable composition from a viewpoint of further increasing curing properties, and a viewpoint of obtaining high general-purpose properties and high simplicity.

Such an ultraviolet curable composition includes a content of the specific metal element of greater than or equal to 10 ppm by mass together with the polymerizable compound, and thus it is possible to make curing properties more sufficient. It is considered that this is because the ultraviolet curable composition includes the specific metal element of greater than or equal to 10 ppm by mass, and thus the specific metal element effectively functions as a catalytic agent of a curing reaction of the polymerizable compound. In addition, in a composition, the content of each of the metal elements included in the group described above is less than or equal to 250 ppm by mass, and the amount of water in the ultraviolet curable composition is less than or equal to 1.0 mass %, and thus it is possible to suppress precipitation of a foreign substance. It is considered that the foreign substance is precipitated due to a metal element which exists in the form of metal ions or a metal salt in moisture, and it is assumed that an amount of the metal element which exists in the form of metal ions or a metal salt in moisture is decreased by setting a content of moisture and metal element to be less than or equal to a predetermined amount, and thus the precipitation of the foreign substance is suppressed. Further, it is possible to increase manufacturing efficiency of the ultraviolet curable composition by setting the amount of water in the ultraviolet curable composition to be greater than or equal to 0.05 mass %. In particular, it is assumed that the amount of water in the ultraviolet curable composition highly depends on an amount of water existing (mixed) in a synthesized polymerizable compound, and it is possible to decrease a load based on a step of decreasing the amount of water existing in the polymerizable compound by setting the amount of water in the ultraviolet curable composition to be greater than or equal to 0.05 mass %. As a result thereof, it is possible to reduce manufacturing time, to simplify the processes, and to decrease an expense, and it is possible to reduce the manufacturing cost. However, the factors are not limited thereto.

The ultraviolet curable composition is able to be used in various applications, and the applications are not limited. As the application, for example, an application for ink and an application for polymerization molding are included. Among them, from a viewpoint of more effectively and reliably obtaining a functional effect according to the invention, the application for ink is preferable, and an application for ink jet is more preferable. Hereinafter, a case where the ultraviolet curable composition of this embodiment is used as an ink composition for ink jet (hereinafter, simply referred to as a "composition") which is one embodiment of an ink jet composition (a composition which is used by being discharged by an ink jet method) is described in more detail, but the ultraviolet curable composition is not limited thereto.

Polymerizable Compound

The composition includes a polymerizable compound. The polymerizable compound is polymerized independently or with a function of a polymerization initiator by applying energy such as light irradiation, and thus it is possible to cure the composition on a recorded medium. The polymerizable compound is not particularly limited, and as the polymerizable compound, a monofunctional monomer, a bifunctional monomer, and a tri or more multifunctional monomer and an oligomer which are known in the related art are able to be used. One of the polymerizable compounds may be independently used, or two or more thereof may be used in combination. Hereinafter, the polymerizable compound will be exempurified.

It is preferable that the polymerizable compound includes a radical polymerizable compound from a viewpoint of further increasing curing properties of the composition, and a viewpoint of obtaining high general-purpose properties and high simplicity. Further, in addition thereto or instead thereof, it is preferable that the polymerizable compound includes a polymerizable compound having a vinyl ether group from a viewpoint of increasing curing properties, of further decreasing a viscosity of the composition, and of increasing solubility of a polymerization initiator at the time of using the polymerization initiator. As the polymerizable compound having a vinyl ether group, a radical polymerizable compound having a vinyl ether group is preferable. It is preferable that, for example, a monofunctional or a multifunctional (meth)acrylate having a vinyl ether group is included as this polymerizable compound from the same viewpoint as that described above.

The monofunctional (meth)acrylate having a vinyl ether group is not particularly limited, and it is preferable that the monofunctional (meth)acrylate having a vinyl ether group includes a polymerizable compound denoted by the following formula (1) from a viewpoint of further decreasing a viscosity of the composition, of having a high ignition point, and of further increasing curing properties of the composition:

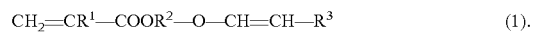

$$CH_2=CR^1-COOR^2-O-CH=CH-R^3 \quad (1).$$

In the formula (1), $R^1$ is a hydrogen atom or a methyl group, $R^2$ is a bivalent organic residue having 2 to 20 carbon atoms, and $R^3$ is a hydrogen atom or a univalent organic residue having 1 to 11 carbon atoms.

As the polymerizable compound denoted by the above-described formula (1), for example, (meth)acrylic acid 2-vinyloxyethyl, (meth)acrylic acid 3-vinyloxypropyl, (meth)acrylic acid 1-methyl-2-vnyloxyethyl, (meth)acrylic acid 2-vinyloxypropyl, (meth)acrylic acid 4-vinyloxybutyl, (meth)acrylic acid 1-methyl-3-vinyloxypropyl, (meth)acrylic acid 1-vinyloxymethyl propyl, (meth)acrylic acid 2-methyl-3-vinyloxypropyl, (meth)acrylic acid 1,1-dimethyl-2-vinyloxyethyl, (meth)acrylic acid 3-vinyloxybutyl, (meth)acrylic acid 1-methyl-2-vinyloxypropyl, (meth)acrylic acid 2-vinyloxybutyl, (meth)acrylic acid 4-vinyloxycyclohexyl, (meth)acrylic acid 6-vinyloxyhexyl, (meth)acrylic acid 4-vinyloxymethyl cyclohexyl methyl, (meth)acrylic acid 3-vinyloxymethyl cyclohexyl methyl, (meth)acrylic acid 2-vinyloxymethyl cyclohexyl methyl, (meth)acrylic acid p-vinyloxymethyl phenyl methyl, (meth)acrylic acid m-vinyloxymethyl phenyl methyl, (meth)acrylic acid o-vinyloxymethyl phenyl methyl, (meth)acrylic acid 2-(vinyloxyethoxy) ethyl, (meth)acrylic acid 2-(vinyloxyisopropoxy) ethyl, (meth)acrylic acid 2-(vinyloxyethoxy) propyl, (meth)acrylic acid 2-(vinyloxyethoxy) isopropyl, (meth)acrylic acid 2-(vinyloxyisopropoxy) propyl, (meth)acrylic acid 2-(vinyloxyisopropoxy) isopropyl, (meth)acrylic acid 2-(vinyloxyethoxy ethoxy) ethyl, (meth)acrylic acid 2-(vinyloxyethoxy isopropoxy) ethyl, (meth)acrylic acid 2-(vinyloxyisopropoxy ethoxy) ethyl, (meth)acrylic acid 2-(vinyloxyisopropoxy isopropoxy) ethyl, (meth)acrylic acid 2-(vinyloxyethoxy ethoxy) propyl, (meth)acrylic acid 2-(vinyloxyethoxy isopropoxy) propyl, (meth)acrylic acid 2-(vinyloxyisopropoxy ethoxy) propyl, (meth)acrylic acid 2-(vinyloxyisopropoxy isopropoxy) propyl, (meth)acrylic acid 2-(vinyloxyethoxy ethoxy) isopropyl, (meth)acrylic acid 2-(vinyloxyethoxy isopropoxy) isopropyl, (meth)acrylic acid 2-(vinyloxyisopropoxy ethoxy) isopropyl, (meth)acrylic acid 2-(vinyloxyisopropoxy isopropoxy) isopropyl, (meth)acrylic acid 2-(vinyloxyethoxy ethoxy ethoxy) ethyl, and (meth)acrylic acid 2-(vinyloxyethoxy ethoxy ethoxy ethoxy) ethyl are included. One of them is independently used, or two or more thereof are used in combination.

Among them, from the same viewpoint as that described above, (meth)acrylic acid 2-(vinyloxyethoxy) ethyl, that is, at least any one of acrylic acid 2-(vinyloxyethoxy) ethyl and methacrylic acid 2-(vinyloxyethoxy) ethyl is preferable, and acrylic acid 2-(vinyloxyethoxy) ethyl is more preferable. Both acrylic acid 2-(vinyloxyethoxy) ethyl and methacrylic acid 2-(vinyloxyethoxy) ethyl have a simple structure and a small molecular weight, and thus it is possible to remarkably decrease a viscosity of the composition. As (meth)acrylic acid 2-(vinyloxyethoxy) ethyl, (meth)acrylic acid 2-(2-vinyloxyethoxy) ethyl and (meth)acrylic acid 2-(1-vinyloxyethoxy) ethyl are included, and as acrylic acid 2-(vinyloxyethoxy) ethyl, acrylic acid 2-(2-vinyloxyethoxy) ethyl and acrylic acid 2-(1-vinyloxyethoxy) ethyl are included. Furthermore, acrylic acid 2-(vinyloxyethoxy) ethyl is more excellent than methacrylic acid 2-(vinyloxyethoxy) ethyl in terms of curing properties.

A content of the polymerizable compound having a vinyl ether group is preferably 10 mass % to 70 mass % with respect to a total amount (100 mass %) of the composition, is more preferably 10 mass % to 60 mass %, and is further preferably 10 mass % to 50 mass %. By setting the content to be greater than or equal to 10 mass %, it is possible to decrease a viscosity of the composition, and curing properties of the composition tends to be more excellent. On the other hand, by setting the content to be less than or equal to 70 mass %, preserving properties of the composition and becomes more excellent, and surface gloss of a printed material tend to be more excellent.

The composition may include one or two or more of a monofunctional monomer, a bifunctional monomer, and a tri or more multifunctional monomer in addition to the exemplifications. The monomer is not particularly limited, and as the monomer, for example, an unsaturated carboxylic acid such as a (meth)acrylic acid, an itaconic acid, a crotonic acid, an isocrotonic acid, and a maleic acid; a salt of the unsaturated carboxylic acid; ester, urethane, amide, and anhydride of the of unsaturated carboxylic acid; acrylonitrile, styrene, various unsaturated polyesters, unsaturated polyethers, unsaturated polyamides, and unsaturated urethanes are included.

A monofunctional oligomer, a bifunctional oligomer, and a tri or more multifunctional oligomer are not particularly limited, and as the oligomer, for example, an oligomer formed of the above-described monomers such as a linear acryl oligomer, epoxy (meth)acrylate, oxetane (meth)acrylate, aliphatic urethane (meth)acrylate, aromatic urethane (meth)acrylate, and polyester (meth)acrylate are included.

In addition, as other monofunctional monomers or multifunctional monomers, an N-vinyl compound may be included. The N-vinyl compound is not particularly limited, and as the N-vinyl compound, for example, N-vinyl formamide, N-vinyl carbazole, N-vinyl acetamide, N-vinyl pyrrolidone, N-vinyl caprolactam, and acryloyl morpholine, and derivatives thereof are included.

The composition may include monofunctional (meth) acrylate as the monofunctional monomer. In this case, a viscosity of the composition decreases, and thus solubility of an additive agent other than the photopolymerization initiator is excellent, and discharge stability at the time of performing ink jet recording is easily obtained. The monofunctional (meth)acrylate is not particularly limited, and as the monofunctional (meth)acrylate, for example, isoamyl (meth)acrylate, stearyl (meth)acrylate, lauryl (meth)acrylate, oxtyl (meth)acrylate, decyl (meth)acrylate, isomyristyl (meth)acrylate, isostearyl (meth) acrylate, 2-ethylhexyl-diglycol (meth) acrylate, 2-hydroxybutyl (meth)acrylate, butoxyethyl (meth)acrylate, ethoxydiethylene glycol (meth) acrylate, methoxydiethylene glycol (meth)acrylate, methoxypolyethylene glycol (meth) acrylate, methoxypropylene glycol (meth) acrylate, phenoxy ethyl (meth)acrylate, tetrahydrofurfuryl (meth) acrylate, isobornyl (meth) acrylate, 2-hydroxyethyl (meth)acrylate, 2-hydroxypropyl (meth)acrylate, 2-hydroxy-3-phenoxy propyl (meth)acrylate, lactone modifiable (meth)acrylate, t-butyl cyclohexyl (meth)acrylate, dicyclopentanyl (meth)acrylate, dicyclopentenyl oxyethyl (meth)acrylate, 2-(isopropenoxy ethoxy) ethyl (meth)acrylate, 2-(isopropenoxy ethoxyethoxy) ethyl (meth)acrylate, 2-(isopropenoxy ethoxy ethoxy ethoxy) ethyl (meth)acrylate, 2-(isopropenoxy ethoxy ethoxy ethoxy) ethyl (meth)acrylate, polyethylene glycol monovinylether (meth)acrylate, and polypropylene glycol monovinylether (meth)acrylate are included. Among them, phenoxy ethyl (meth)acrylate is preferable.

A content of the monofunctional monomer is preferably 10 mass % to 60 mass % with respect to the total amount (100 mass %) of the composition, and is more preferably 20 mass % to 50 mass %. By setting the content to be in the preferred range described above, curing properties, initiator solubility, preservation stability, and discharge stability tend to be more excellent.

The composition may include multifunctional (meth) acrylate as the multifunctional monomer. Bifunctional (meth)acrylate is not particularly limited, and as the bifunctional (meth)acrylate, for example, triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, ethylene oxide (EO) adduct di(meth)acrylate of bisphenol A, propylene oxide (PO) adduct di(meth)acrylate of bisphenol A, hydroxypivalic acid neopentyl glycol di(meth)acrylate, polytetramethylene glycol di(meth)acrylate, diethylene glycol di(meth)acrylate, and triethylene glycol di(meth)acrylate are included.

In addition, as tri or more functional (meth)acrylate, for example, trimethylolpropane tri(meth)acrylate, EO modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra (meth)acrylate, glycerin propoxy tri(meth)acrylate, caprolactone modified trimethylolpropane tri(meth)acrylate, pentaerythritolethoxy tetra(meth)acrylate, and caprolactam modified dipentaerythritol hexa(meth)acrylate are included.

Among them, dipropylene glycol di(meth)acrylate, tripropylene glycol di(meth)acrylate, diethylene glycol di(meth)acrylate, triethylene glycol di(meth)acrylate, and pentaerythritol tri(meth)acrylate are preferable, and dipropylene glycol di(meth)acrylate and pentaerythritol tri(meth)acrylate are more preferable.

A content of the multifunctional monomer is preferably 5 mass % to 60 mass % with respect to the total amount (100 mass %) of the composition, is more preferably 10 mass % to 50 mass %, and is further preferably 15 mass % to 40 mass %. By setting the content to be in the preferred range described above, curing properties, preservation stability, discharge stability, and surface gloss of the printed material tend to be more excellent.

In addition, in order to increase toughness, heat resistance, and chemical resistance of a cured film, it is preferable that the monofunctional (meth)acrylate and the bifunctional (meth)acrylate are used together, and among them, it is more preferable that phenoxy ethyl (meth)acrylate and dipropylene glycol di(meth)acrylate are used together.

A content of the polymerizable compound is preferably 35 mass % to 95 mass % with respect to the total amount (100 mass %) of the composition, 45 mass % to 90 mass %. By setting the content of the polymerizable compound to be in the range described above, it is possible to further decrease a viscosity and odor, and it is possible to make solubility of the photopolymerization initiator and surface gloss of the reactive printed material more excellent.

Metal Element

The composition of this embodiment includes at least one metal element selected from a group consisting of Li, Na, K, Ag, Mg, Ca, Ba, Zn, Fe, Sn, Al, and Zr. It is considered that the specific metal element effectively functions as a catalytic agent a polymerizable compound, in particular, a polymerization reaction (a curing reaction) of a radical polymerizable compound. It is preferable that the composition includes the specific metal element in at least one form of metal ions and a metal salt. When the specific metal element exists in the form of the metal ions or the metal salt in the composition, a foreign substance is easily precipitated, but it is possible to suppress the precipitation of the foreign substance according to the invention, and thus it is possible to more effectively obtain advantages based on the invention.

A content of the specific metal element in the composition is greater than or equal to 10 ppm by mass with respect to the total amount (100 mass %) of the composition from a viewpoint of increasing curing properties of the composition, and is preferably greater than or equal to 20 ppm by mass. In addition, from the same viewpoint as that described above, a content of three or more metal elements selected from the group described above is preferably greater than or equal to 10 ppm by mass, and is more preferably greater than or equal to 20 ppm by mass, and a content of five or more metal elements is preferably greater than or equal to 10 ppm by mass, and is more preferably greater than or equal to 20 ppm by mass. On the other hand, a content of each metal element included in the group described above is less than or equal to 250 ppm by mass from a viewpoint of suppressing the precipitation of the foreign substance. In other words, a content of any metal element included in the group described above is less than or equal to 250 ppm by mass. From the same viewpoint as that described above, the content of each of the metal elements is preferably less than or equal to 200 ppm by mass, and is more preferably less than or equal to 175 ppm by mass. Further, from a viewpoint of further increasing curing properties of the composition, of further suppressing the precipitation of the foreign substance, and of making preservation stability more excellent, among the metal elements included in the group described above, three or more metal elements of which a content is 10 ppm by mass to 250 ppm by mass with respect to the total amount (100 mass %) of the composition are preferable, five or more metal elements are more preferable, eight or more metal elements are further preferable, ten or more metal elements are particularly preferable, and twelve, that is, all of the metal elements are extremely preferable. On the other hand, in particular, from a viewpoint of emphasizing on suppression of the precipitation of the foreign substance, among the metal elements included in the group described above, ten or less metal elements of which a content is 10 ppm by mass to 250 ppm by mass total amount (100 mass %) of the composition metal element are preferable, and eight or less metal elements are more preferable. Further, from the same viewpoint as that described above, among the metal elements included in the group described above, three to ten metal elements of which a content is 10 ppm by mass to 250 ppm by mass total amount (100 mass %) of the composition are preferable, and five to eight metal elements are more preferable.

As a method adjusting the content of the specific metal element in each component of the composition, for example, a method in which a pigment is purified, and a content of a metal element included in the pigment is adjusted, a method in which a content of a metal element is adjusted at the time of preparing a pigment dispersion liquid, and a method in which a material of a container which is in contact with the composition are included. In addition, the content of the specific metal element in the composition is measured on the basis of a method of the following example.

Moisture

The composition of this embodiment includes moisture, and an amount of water is greater than or equal to 0.05 mass % and less than or equal to 1.0 mass % with respect to the total amount (100 mass %) of the composition. Accordingly, it is possible to increase manufacturing efficiency of the composition, and it is possible to further suppress the precipitation of the foreign substance. Further, when the composition includes the polymerizable compound having a vinyl ether group, it is possible to increase preservation stability of the composition, and when the composition includes an acylphosphine oxide-based photopolymerization initiator, it is possible to preferably dissolve the photopolymerization initiator in the composition. It is preferable that the amount of water is greater than or equal to 0.1 mass % from a viewpoint of further increasing manufacturing efficiency of the composition. On the other hand, from a viewpoint of further suppressing the precipitation of the foreign substance, a viewpoint of further increasing preservation stability of the composition when the composition includes the polymerizable compound having a vinyl ether group, and a viewpoint of preferably dissolving the photopolymerization initiator in the composition when the composition includes the acylphosphine oxide-based photopolymerization initiator, the amount of water is less than or equal to 0.5 mass %.

As a method adjusting the amount of water in the composition, for example, a method decreasing an amount of water in each component of the composition, for example, in the polymerizable compound, a method eliminating moisture from the composition, a method decreasing an amount of water mixed into the composition at the time of preparing the composition, and the like are included. Among them, as the method decreasing the amount of water in the polymerizable compound, more specifically, a distillation purification method in which the polymerizable compound is subjected to distillation purification, a method in which the polymerizable compound permeates a semi-permeable film through which water selectively permeates, and a method in which water is selectively adsorbed into a water adsorbent adsorbing the water are included. Among them, from a viewpoint of more efficiently and reliably decreasing the amount of water, the distillation purification method is preferable. The amount of water is measured on the basis of a method of the following example.

As the moisture, for example, water such as ion-exchange water, ultrafiltration water, reverse osmosis water, pure water such as distillation water, and ultrapure water from which ionic impurities are maximally eliminated is included. In addition, when water which is sterilized by ultraviolet irradiation or an addition of hydrogen peroxide is used, it is possible to prevent fungus or bacteria from being generated when ink is stored for a long period of time. Accordingly, storage stability tends to be further improved.

The composition of this embodiment may include an arbitrary component which is able to be used for an ultraviolet curable ink composition for ink jet of the related art in addition to each of the components described above. As such an arbitrary component, for example, a polymerization initiator, a color material such as a pigment and colorant, a dispersing agent, a polymerization inhibitor, a surfactant agent, a penetrating agent, a moisturizing agent, a dissolution auxiliary agent, a viscosity adjusting agent, a pH adjusting agent, an antioxidizing agent, an antiseptic agent, a mildewproof agent, a corrosion inhibitor, and a chelating agent for capturing metal ions affecting a dispersion, and other additive agents and a solvent are included. One of them is independently used, or two or more thereof are used in combination.

Polymerization Initiator

The composition of this embodiment may include a polymerization initiator. The polymerization initiator is not limited insofar as the polymerization initiator generates activated species such as radicals or cations by thermal energy or energy of light such as ultraviolet ray, and initiates a polymerization of the polymerizable compound described above, and as the polymerization initiator, a photopolymerization initiator is preferable, and a photoradical polymerization initiator is preferable. The photoradical polymerization initiator is not particularly limited, and as the photoradical polymerization initiator, an acylphosphine oxide-based photopolymerization initiator and a thioxanthone-based photopolymerization initiator are preferable, and the acylphosphine oxide-based photopolymerization initiator is more preferable.

Acylphosphine Oxide-Based Photopolymerization Initiator

It is preferable that the composition includes an acylphosphine oxide-based photopolymerization initiator. The acylphosphine oxide-based photopolymerization initiator is easily affected by oxygen inhibition, but is suitable for curing in an LED of long wavelength light. In addition, in the acylphosphine oxide-based photopolymerization initiator, the amount of water in the composition is less than or equal to 1.0 mass % the with respect to the total amount of the composition, and thus the acylphosphine oxide-based photopolymerization initiator is able to more preferably dissolved in the composition.

The acylphosphine oxide-based photopolymerization initiator is not particularly limited, and specifically, as the acylphosphine oxide-based photopolymerization initiator, bis(2,4,6-trimethyl benzoyl)-phenylphosphine oxide, 2,4,6-trimethyl benzoyl-diphenyl-phosphine oxide, and bis-(2,6-dimethoxy benzoyl)-2,4,4-trimethyl pentyl phosphine oxide are included.

A commercialized product of the acylphosphine oxide-based photopolymerization initiator is not particularly limited, and as the commercialized product, for example, IRGACURE 819 (a trade name, manufactured by BASF Societas *Europaea*, bis(2,4,6-trimethyl benzoyl)-phenylphosphine oxide), IRGACURE TPO (a trade name, manufactured by BASF Societas *Europaea*, 2,4,6-trimethyl benzoyl-diphenyl-phosphine oxide), SPEEDCURE TPO (a trade name, manufactured by Lambson Ltd., 2,4,6-trimethyl benzoyl-diphenyl-phosphine oxide) and DAROCUR TPO (a trade name, manufactured by BASF Societas *Europaea*, 2,4,6-trimethyl benzoyl-diphenyl-phosphine oxide) are included.

A content of the acylphosphine oxide-based photopolymerization initiator is preferably 1.0 mass % to 10 mass % with respect to the total amount (100 mass %) of the composition, and is more preferably 2.0 mass % to 8.0 mass %. By setting the content to be greater than or equal to 1.0 mass %, curing properties tend to be more excellent. In addition, by setting the content to be less than or equal to 10 mass %, dissolution or preservation stability of solid is maintained to be excellent, and reliability tends to be more excellent.

Thioxanthone-Based Photopolymerization Initiator

The composition may include a thioxanthone-based photopolymerization initiator. The composition includes the thioxanthone-based photopolymerization initiator, and thus it is possible to decrease surface tackiness, and in particular, it is possible to prevent color mixture and ooze between dots by curing an ink surface at the time of forming a thin film which is easily affected by oxygen inhibition. In addition, it is preferable that the acylphosphine oxide-based photopolymerization initiator and the thioxanthone-based photopolymerization initiator are used because the color mixture and the ooze between dots are excellently prevented by a curing process using an UV-LED, and curing properties and adhesiveness of the composition tend to be more excellent.

The thioxanthone-based photopolymerization initiator is not particularly limited, and specifically, as the thioxanthone-based photopolymerization initiator, a thioxanthone-based photopolymerization initiator including at least one selected from a group consisting of thioxanthone, diethylthioxanthone, isopropyl thioxanthone, and chlorothioxanthone is preferable. Furthermore, it is not particularly limited, but as diethylthioxanthone, 2,4-diethylthioxanthone is preferable, as isopropyl thioxanthone, 2-isopropyl thioxanthone is preferable, and as chlorothioxanthone, 2 chlorothioxanthone is preferable. According to the composition including such a thioxanthone-based photopolymerization initiator, curing properties, preservation stability, and discharge stability tend to be more excellent. Among them, the thioxanthone-based photopolymerization initiator including diethylthioxanthone is preferable. The thioxanthone-based photopolymerization initiator includes diethylthioxanthone, and thus it is possible to more efficiently convert ultraviolet light (UV light) in a wide region into activated species.

A commercialized product of the thioxanthone-based photopolymerization initiator is not particularly limited, and specifically, as the commercialized product, Speedcure DETX (2,4-diethylthioxanthone), Speedcure ITX (2-isopropyl thioxanthone)(manufactured by Lambson Ltd.), and KAYACURE DETX (2,4-diethylthioxanthone)(manufactured by Nippon Kayaku Co., Ltd.) are included.

A content of the thioxanthone-based photopolymerization initiator is preferably 0.5 mass % to 5.0 mass % with respect to the total amount (100 mass %) of the composition, and is more preferably 1.0 mass % to 4.0 mass %. By setting the content to be greater than or equal to 0.5 mass %, it is possible to further decrease surface tackiness, and it is possible to prevent color mixture and ooze between dots by curing an ink surface at the time of forming a thin film which is easily affected by oxygen inhibition. In addition, by setting the content to be less than or equal to 5.0 mass %, coloring of ink due to the initiator itself decreases, yellowing of a color phase decreases, and adhesiveness of a cured film tends to be more excellent.

Other Photopolymerization Initiator

The composition may further include one or two or more of a photoradical polymerization initiator other than the photoradical polymerization initiator described above or a photocationic polymerization initiator. As the other photoradical polymerization initiator, for example, aromatic ketones, an aromatic onium salt compound, organic peroxide, a thiocompound (a compound having a thiophenyl group or the like), an α-aminoalkylphenone compound, a hexaaryl biimidazole compound, a ketoxime ester compound, a borate compound, an azinium compound, a metallocene compound, an active ester compound, a compound having a carbon-halogen bond, and an alkyl amine compound are included.

A commercialized product of the other photoradical polymerization initiator is not particularly limited, and as the commercialized product, for example, IRGACURE 651 (2,2-dimethoxy-1,2-diphenylethane-1-one), IRGACURE 184 (1-hydroxy-cyclohexyl-phenyl-ketone), DAROCUR 1173 (2-hydroxy-2-methyl-1-phenyl-propane-1-one), IRGACURE 2959 (1-[4-(2-hydroxy ethoxy)-phenyl]-2-hydroxy-2-methyl-1-propane-1-one), IRGACURE 127 (2-hydroxy-1-{4-[4-(2-hydroxy-2-methyl-propionyl)-benzyl] phenyl}-2-methyl-propane-1-one}, IRGACURE 907 (2-methyl-1-(4-methylthiophenyl)-2-morpholinopropane-1-one), IRGACURE 369 (2-benzyl-2-dimethylamino-1-(4-morpholinophenyl)-butanone-1), IRGACURE 379 (2-(dimethyl amino)-2-[(4-methyl phenyl) methyl]-1-[4-(4-monopholinyl) phenyl]-1-butanone), IRGACURE 784 (bis (η5-2,4-cyclopentadiene-1-yl)-bis(2,6-difluoro-3-(1H-pyrrole-1-yl)-phenyl) titanium), IRGACURE OXE 01 (1.2-octanedione, 1-[4-(phenylthio)-,2-(O-benzoyloxime)]), IRGACURE OXE 02 (ethanone, 1-[9-ethyl-6-(2-methylbenzoyl)-9H-carbazole-3-yl]-,1-(O-acetyloxime)), IRGACURE 754 (a mixture of an oxyphenylacetic acid, 2-[2-oxo-2-phenylacetoxy ethoxy]ethylester, an oxyphenylacetic acid, and 2-(2-hydroxyethoxy) ethylester) (manufactured by BASF Societas *Europaea*), Speedcure TPO (manufactured by Lambson Ltd.), Lucirin TPO, LR8893, LR8970 (manufactured by BASF Societas *Europaea*), and Ubecryl P36 (manufactured by UCB Co. Ltd.) are included.

The other photocationic polymerization initiator is not particularly limited, and specifically, as the other photocationic polymerization initiator, a sulfonium salt and an iodonium salt are included.

A content of the photopolymerization initiator is preferably 5 mass % to 20 mass % with respect to the total amount (100 mass %) of the composition. By setting the content to be in the range described above, an ultraviolet ray curing speed is sufficiently obtained, and it is possible to prevent the photopolymerization initiator from remaining as an undissolved residue or coloring due to the photopolymerization initiator.

Color Material

A color material is not particularly limited, and as the color material, for example, a pigment and a colorant are included.

As the pigment, for example, and inorganic pigment and an organic pigment are included. The inorganic pigment is not particularly limited, and for example, carbon blacks (C.I. Pigment Black 7) such as furnace black, lamp black, acetylene black, and channel black, iron oxide, and titanium oxide are included.

The organic pigment is not particularly limited, and for example, a quinacridone-based pigment, a quinacridonequinone-based pigment, a dioxadiene-based pigment, a phthalocyanine-based pigment, an anthrapyrimidine-based pigment, an anthanthrone-based pigment, an indanthrone-based pigment, a flavanthrone-based pigment, a perylene-based pigment, a diketopyrrolopyrrole-based pigment, a perinone-based pigment, a quinophthalone-based pigment, an anthraquinone-based pigment, a thioindigo-based pigment, a benzimidazolone-based pigment, an isoindolinone-based pigment, an azomethine-based pigment, and an azo-based pigment are included.

One of the pigments is independently used, or two or more thereof are used in combination.

A content of the pigment is preferably 0.1 mass % to 15 mass % with respect to the total amount (100 mass %) of the composition, is more preferably 0.5 mass % to 10 mass %, and further preferably 1.0 mass % to 5.0 mass %. By setting the content of the pigment to be in the range described above, color developing properties tend to be more excellent.

The colorant is not particularly limited, and as the colorant, an acidic colorant, a direct colorant, a reactive colorant, and a basic colorant are able to be used. As the colorant, for example, C.I. Acid Yellow 17, 23, 42, 44, 79, 142, C.I. Acid Red 52, 80, 82, 249, 254, 289, C.I. Acid Blue 9, 45, 249, C.I. Acid Black 1, 2, 24, 94, C.I. Food Black 1, 2, C.I. Direct Yellow 1, 12, 24, 33, 50, 55, 58, 86, 132, 142, 144, 173, C.I. Direct Red 1, 4, 9, 80, 81, 225, 227, C.I. Direct Blue 1, 2, 15, 71, 86, 87, 98, 165, 199, 202, C.I. Direct Black 19, 38, 51, 71, 154, 168, 171, 195, C.I. Reactive Red 14, 32, 55, 79, 249, and C.I. Reactive Black 3, 4, 35 are included.

One of colorants is independently used, or two or more thereof are used in combination.

A content of the colorant is preferably 1.0 mass % to 20 mass % with respect to the total amount (100 mass %) of the composition from a viewpoint of obtaining excellent shielding properties and color reproducibility.

Dispersing Agent

When the composition includes the pigment, dispersing properties of the pigment becomes more excellent, and thus the composition may further include one or two or more dispersing agents. The dispersing agent is not particularly limited, and as the dispersing agent, for example, a dispersing agent which is commonly used for preparing a pigment dispersion liquid such as a high molecular dispersing agent is included. As a specific example thereof, a dispersing agent including at least one of polyoxyalkylene polyalkylene polyamine, a vinyl-based polymer and copolymer, an acryl-based polymer and copolymer, polyester, polyamide, polyimide, polyurethane, an amino-based polymer, a silicon-containing polymer, a sulfur-containing polymer, a fluorine-containing polymer, and an epoxy resin as a main component is included. As a commercialized product of the high molecular dispersing agent, Ajisper series manufactured by Ajinomoto Fine-Techno Co., Inc., Solsperse series (for example, "Solsperse 36000") manufactured by Lubrizol Corporation, DisperBYK series manufactured by BYK-Chemie HmbH, and Disparlon series manufactured by Kusumoto Chemicals, Ltd. are included.

Polymerization Inhibitor

The composition may include one or two or more polymerization inhibitors from a viewpoint of further increasing preservation stability or the like. The polymerization inhibitor is not particularly limited, and as the polymerization inhibitor, for example, a hindered amine compound such as a compound having a 2,2,6,6-tetramethylpiperidine-N-oxyl skeleton, a compound having a 2,2,6,6-tetramethylpiperidine skeleton, a compound having a 2,2,6,6-tetramethylpiperidine-N-alkyl skeleton, and a compound having a 2,2,6,6-tetramethylpiperidine-N-acyl skeleton; p-methoxyphenol, hydroquinone monomethyl ether (MEHQ), hydroquinone, cresol, t-butyl catechol, 3,5-di-t-butyl-4-hydroxy toluene, 2,2'-methylene bis(4-methyl-6-t-butylphenol), 2,2'-methylene bis(4-ethyl-6-butylphenol), and 4,4'-thiobis(3-methyl-6-t-butylphenol) are included.

The ultraviolet curable composition of this embodiment is stored in a storage body. In other words, the storage body of this embodiment stores the ultraviolet curable composition of this embodiment. Hereinafter, a case where the ultraviolet curable composition is used as an ink composition for ink jet will be described in more detail.

Storage Body

An aspect of the storage body of this embodiment is not limited to the following aspects, and as the aspect of the storage body, for example, an ink cartridge, a pack, a bottle, a tank, a pin, and a can are included. Among them, an ink cartridge, a pack, a bottle, and a tank are preferable because they are generalized and easily control a moisture vapor transmission rate described later such that the rate becomes a desired value, and a pack is more preferable. In addition, as the container filled with the composition of the storage body (in the storage body, a member which is filled with the composition and substantially maintains the composition), the storage body including the container (the pack) using a flexible film is preferable from a point of a weight reduction, of easily putting the container into a box-like storage body, of easily change a volume of the container according to a residual quantity of the composition, and of using a film by performing thermal fusion (heat sealing) with respect to the film and by processing the film into the shape of a sac.

Furthermore, as a usage mode of the storage body of this embodiment, at least (A) a configuration of an ink cartridge or the like which is separated from a recording device and is mounted on the recording device, and sequentially supplies the composition to the recording device, (B) a configuration which is separated from the recording device, and moves only the composition from the storage body to the recording device at the time of using the composition, and (C) a configuration of a tank or the like which is provided in the recording device in advance, and stores the composition are included.

(A) and (B) described above are able to be the storage body of the composition immediately before the composition is supplied (moved) to the recording device after the storage body is shipped out. (C) described above is able to be the storage body of the composition before a use of an initial composition is initiated by the recording device after the recording device is shipped out. Furthermore, in a state where the composition is supplied to the recording device from the container through a connection portion such as an ink tube, (A) and (C) described above are able to be the storage body of the composition performing printing of the recording device. In addition, (B) described above is able to be the storage body of the composition performing printing by the recording device after moving the composition to the recording device from the storage body. Furthermore, in (B) described above, as a target to which the composition is moved, a tank provided in the recording device or the like is included.

A configuration material of the container which is filled with the composition is not limited to the following materials, and as the configuration material, for example, polyethylene terephthalate (PET), polypropylene (PP), polyethylene, an ethylene vinyl acetate copolymer, an ethylene vinyl alcohol copolymer (EVOH), and polystyrene are included, and a film thereof may be included. The above-described materials may be mixed at a suitable ratio, or a plurality thereof may be overlapped with each other. In case of the film, the film may be obtained by being laminated. When a plurality of films are overlapped with each other, it is necessary that all of the plurality of films are the film described above, and a part thereof may be a film configured of other materials, for example, metal and a metal compound.

In addition, from a viewpoint of increasing flexibility of the container, it is preferable that a plasticizing agent is included as the configuration material of the container. As the plasticizing agent, for example, fatty acid ester, an epoxy compound, and a polyester compound are included. Among them, from a point of general-purpose properties of the plasticizing agent, fatty acid ester is preferable, and as the fatty acid ester, for example, phthalic acid ester, adipic acid ester, trimellitic acid ester, and citric acid ester are included. One of the fatty acid esters is independently used, or two or more thereof are used in combination.

It is considered that when the container includes the plasticizing agent as the configuration material, the plasticizing agent is eluted into the composition, a metal salt is formed together with the specific metal element in the composition. Then, it is presumed that the metal salt is one of factors precipitating the foreign substance in the composition. The composition of the invention has an effect of suppressing the precipitation of the foreign substance, and thus when the container includes the plasticizing agent as the configuration material, it is possible to more effectively obtain advantages based on the invention.

The storage body may be stirred during keeping and transporting in order to prevent the component included in the composition from being settled out. After settling out the component in the composition, when a long period of time has elapsed, a precipitate becomes a cake, and thus it may be difficult to prevent the precipitate from being a cake. In addition, when the composition is supplied to the recording device from the storage body, it is preferable that the storage body is stirred in order to prevent the component from being settled out.

When the container is a container (a pack) using a flexible film, in particular, durability is necessary without having a crack or a break according to a stirring operation. As a film material having excellent durability, for example, a plastic film of polyethylene terephthalate (PET), polypropylene, polyethylene, an ethylene vinyl acetate copolymer, an ethylene vinyl alcohol copolymer, polystyrene, and the like is preferably included, and a plastic film of an ethylene vinyl acetate copolymer is more preferable. As the film, an extended plastic film of polyethylene, polypropylene, an ethylene-vinyl alcohol copolymer, polystyrene, and the like which have high density, low density, or linear low density is preferably included. The film may be a laminated film in which multilayered films are joined to each other.

In a case where the container is the pack described above, when the component included in the composition is settled out or the like, the settled component may be recovered by horizontally vibrating the pack and stirring ink. In this case, from a point of preventing a crack or a break of the pack from occurring, it is preferable that a plasticizing agent is included as a configuration material of the pack. As the plasticizing agent, any one described above is included, and fatty acid ester is preferable.

When the container is the pack described above, a moisture vapor transmission rate of the film configuring the pack is preferably less than or equal to 30 g/m$^2$·24 hrs, is more preferably less than or equal to 15 g/m$^2$·24 hrs, is further preferably less than or equal to 10 g/m$^2$·24 hrs, and is particularly preferably less than or equal to 5.0 g/m$^2$·24 hrs. By using the film of which the moisture vapor transmission rate is less than or equal to 30 g/m$^2$·24 hrs, it is possible to suppress an increase in an amount of water in the composition filling the inside of the pack even when the pack is stored for a long period of time. In order to set the moisture vapor transmission rate to be less than or equal to 30 g/m$^2$·24 hrs, for example, a material configuring the film may be selected, or a layer configured of at least one of metal and a metal compound may be disposed on the film. Among them, from a viewpoint of increasing general-purpose properties, it is preferable that the layer configured of at least one of metal and a metal compound is disposed. As the metal, for example, Al and Ti are included. As the metal compound, a metal oxide is preferable, and for example, alumina, silica, titania, and zirconia are included. One of them is independently used, or two or more thereof are used in combination. Furthermore, herein, the metal oxide includes silica.

A thickness of the film configuring the pack is preferably 50 μm to 200 μm, is more preferably greater than or equal to 70 μm, is further preferably greater than or equal to 80 μm, is preferably less than or equal to 150 μm, and is more preferably less than or equal to 130 μm. The thickness of the film is a total thickness when the film is a laminated film configured of a plurality of layers. It is preferable that the thickness of the film is in the range described above from a point of durability or flexibility of the film.

Here, the moisture vapor transmission rate is a value measured by a thickness corresponding to 100 μm under an environment of 40° C. and relative humidity of 90%, and for example, among materials described in Technology of Transporting and Industrial Packing (an editorial supervision: MIZGUCHI Shinich, published by Fuji Techno System Co., Ltd.), a material satisfying the moisture vapor transmission rate described above is able to be used.

A capacity of the composition which is able to be stored in the storage body is not limited to the following values, and is preferably 100 mL to 5000 mL, a lower limit thereof is preferably greater than or equal to 200 mL, is more preferably greater than or equal to 500 mL, and an upper limit thereof is preferably less than or equal to 3000 mL, is more preferably less than or equal to 2000 mL, and is further preferably less than or equal to 1000 mL. When the capacity is in the range described above, it is possible to make any one of curing properties, preservation stability, and discharge stability more excellent.

Here, an ink cartridge which is an example of the storage body of this embodiment will be described. FIG. 1 is an exploded perspective view illustrating an ink cartridge 40. The ink cartridge 40 is provided with an ink pack 70 which is filled with ink, and a cartridge case 72 including a main body case 76 and a lid portion 78 in which the ink pack 70 is stored to be protected, the ink pack 70 is provided with an ink supply port 74, the main body case is provided with a cut-out portion 80 and a groove portion 86, and the lid portion 78 is provided with a pressing portion 82 and a hook portion 84. As a material of the ink pack, the materials described above are able to be used. In the ink cartridge 40, the ink pack 70 is stored in the main body case 76 and the lid portion 84, and at this time, the ink supply port 74 is fitted into the cut-out portion 80, and then is fixed by being interposed between the pressing portion 82 and the cut-out portion 80. In addition, the main body case 76 and the lid portion 84 are sealed by fitting the hook portion 84 into the groove portion 86.

Thus, according to this embodiment, it is possible to provide the storage body storing the ultraviolet curable composition which has excellent curing properties and high manufacturing efficiency, and is able to suppress the precipitation of the foreign substance.

An entire storage body or at least a part of the container may be further sealed by being stored in the sac-like member. Accordingly, it is possible to more effectively and reliably prevent the amount of water in the composition from being increased. As the sac-like member, a member in which the film configuring the container is formed in the shape of a sac is able to be used. In addition, similar to the case where the container is the pack, the moisture vapor transmission rate of the film is preferably less than or equal to 30 g/m²·24 hrs, is more preferably less than or equal to 15 g/m²·24 hrs, is further preferably less than or equal to 10 g/m²·24 hrs, and is particularly preferably less than or equal to 5.0 g/m²·24 hrs.

In an ink jet recording device and an ink jet recording method of this embodiment, the composition attached onto the recorded medium may cured by ultraviolet irradiation using the ink composition for ink jet and the storage body, and other configurations are not particularly limited. For example, as the other configuration, a configuration which is known in the related art may be used. According to the ink jet recording device and the ink jet recording method of this embodiment, the ink composition for ink jet has excellent curing properties and is able to suppress the precipitation of the foreign substance in the composition, and thus the ink composition for ink jet has excellent discharge stability. In addition, in particular, when the composition includes the polymerizable compound having a vinyl ether group, the composition has excellent preservation stability although the composition is cured by ultraviolet irradiation. Further, when the composition includes the polymerizable compound having a vinyl ether group, it is possible to decrease a viscosity of the composition, and thus from this viewpoint, it is possible to further increase discharge stability.

Hereinafter, embodiments (hereinafter, referred to as "this embodiment") of the second aspect of the invention will be described in detail with reference to the drawing, as necessary, but the invention is not limited thereto, and is able to be variously changed within a range without deviating from the gist. Furthermore, in the drawing, the same reference numerals are applied to the same constituents, and the repeated description thereof will be omitted. In addition, unless otherwise mentioned, a positional relationship such as up, down, right, and left is based on a positional relationship illustrated in the drawing. Further, a dimension ratio in the drawing is not limited to a ratio illustrated in the drawing. In addition, herein, "(meth)acryl" indicates "acryl" and "methacryl" corresponding thereto, "(meth)acrylate" indicates "acrylate" and "methacrylate" corresponding thereto, and "(meth)acryloyl" indicates "acryloyl" and "methacryloyl" corresponding thereto.

Ultraviolet Curable Ink Jet Composition

An ultraviolet curable ink jet composition of this embodiment (hereinafter, simply referred to as "composition") is a composition which is discharged and used by an ink jet method and a composition stored in a storage body, and includes a polymerizable compound having a vinyl ether group and a (meth)acryloyl group, and moisture. An amount of water included in the composition is greater than or equal to 0.05 mass % and less than or equal to 1.0 mass % with respect to the total amount of the composition. It is preferable that the composition is a radical polymerizable ultraviolet curable composition from a viewpoint of further increasing curing properties. Hereinafter, as one embodiment of the composition, an "ink composition" which is used for recording will be described, and the composition may be a composition other than the ink composition.

Such an ink composition includes the polymerizable compound having a vinyl ether group and a (meth)acryloyl group, and in the polymerizable compound, a polymerization reaction rapidly progresses, and thus the composition has excellent curing properties. On the other hand, in general, when the ink composition includes such a polymerizable compound in which a polymerization reaction easily progresses, the polymerizable compound is slightly reacted during keeping, and thus preservation stability decreases. However, in the ink composition of this embodiment, the amount of water is greater than or equal to 0.05 mass % and less than or equal to 1.00 mass %, and a specific amount of moisture is able to suppress a reaction of the polymerizable compound while the ink composition is stored, and thus the composition has excellent preservation stability. However, factors enabling the ink composition of this embodiment to make curing properties and preservation stability compatible at a high level are not limited thereto.
Polymerizable Compound The ink composition includes one or two or more polymerizable compounds having a vinyl ether group and a (meth)acryloyl group. Such a polymerizable compound is polymerized independently or with a function of a polymerization initiator by applying energy such as light irradiation, and thus it is possible to cure the ink composition on a recorded medium. The polymerizable compound is not particularly limited, and as the polymerizable compound, (meth)acrylate having a vinyl ether group is preferably from a viewpoint of more effectively and reliably resolve the problems of the invention. It is preferable that a monofunctional or multifunctional (meth)acrylate having a vinyl ether group is included as the polymerizable compound from the same viewpoint as that described above.

The monofunctional (meth)acrylate having a vinyl ether group is not particularly limited, and it is preferable that the monofunctional (meth)acrylate having a vinyl ether group includes a polymerizable compound denoted by the following formula (1) from a viewpoint of further decreasing a viscosity of the ink composition, of having a high ignition point, and of further increasing curing properties of the ink composition:

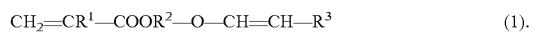

$$CH_2=CR^1-COOR^2-O-CH=CH-R^3 \quad (1).$$

In the formula (1), $R^2$ is a hydrogen atom or a methyl group, $R^2$ is a bivalent organic residue having 2 to carbon atoms, and $R^3$ is a hydrogen atom or a univalent organic residue having 1 to 11 carbon atoms. The polymerizable compound denoted by the above-described formula (1) further increases curing properties of the ink composition, and thus easily decreases preservation stability, but it is possible to more efficiently suppress a decrease in preservation stability by including the configuration of the ink composition of this embodiment. As a result thereof, when the ink composition of this embodiment includes the polymerizable compound denoted by the above-described formula (1), it is possible to make curing properties and preservation stability compatible at a higher level.

As the polymerizable compound denoted by the above-described formula (1), for example, (meth)acrylic acid 2-vinyloxyethyl, (meth)acrylic acid 3-vinyloxypropyl, (meth)acrylic acid 1-methyl-2-vinyloxyethyl, (meth)acrylic acid 2-vinyloxypropyl, (meth)acrylic acid 4-vinyloxybutyl, (meth)acrylic acid 1-methyl-3-vinyloxypropyl, (meth)acrylic acid 1-vinyloxymethyl propyl, (meth)acrylic acid 2-methyl-3-vinyloxypropyl, (meth)acrylic acid 1,1-dimethyl-2-vinyloxyethyl, (meth)acrylic acid 3-vinyloxybutyl, (meth)acrylic acid 1-methyl-2-vinyloxypropyl, (meth)acrylic acid 2-vinyloxybutyl, (meth)acrylic acid 4-vinyloxycyclohexyl, (meth)acrylic acid 6-vinyloxyhexyl, (meth)acrylic acid 4-vinyloxymethyl cyclohexyl methyl, (meth)acrylic acid 3-vinyloxymethyl cyclohexyl methyl, (meth)acrylic acid 2-vinyloxymethyl cyclohexyl methyl, (meth)acrylic acid p-vinyloxymethyl phenyl methyl, (meth)acrylic acid m-vinyloxymethyl phenyl methyl, (meth)acrylic acid o-vinyloxymethyl phenyl methyl, (meth)acrylic acid 2-(vinyloxyethoxy) ethyl, (meth)acrylic acid 2-(vinyloxyisopropoxy) ethyl, (meth)acrylic acid 2-(vinyloxyethoxy) propyl, (meth)acrylic acid 2-(vinyloxyethoxy) isopropyl, (meth)acrylic acid 2-(vinyloxyisopropoxy) propyl, (meth)acrylic acid 2-(vinyloxyisopropoxy) isopropyl, (meth)acrylic acid 2-(vinyloxyethoxy ethoxy) ethyl, (meth)acrylic acid 2-(vinyloxyethoxy isopropoxy) ethyl, (meth)acrylic acid 2-(vinyloxyisopropoxy ethoxy) ethyl, (meth)acrylic acid 2-(vinyloxyisopropoxy isopropoxy) ethyl, (meth)acrylic acid 2-(vinyloxyethoxy ethoxy) propyl, (meth)acrylic acid 2-(vinyloxyethoxy isopropoxy) propyl, (meth)acrylic acid 2-(vinyloxyisopropoxy ethoxy) propyl, (meth)acrylic acid 2-(vinyloxyisopropoxy isopropoxy) propyl, (meth)acrylic acid 2-(vinyloxyethoxy ethoxy) isopropyl, (meth)acrylic acid 2-(vinyloxyethoxy isopropoxy) isopropyl, (meth)acrylic acid 2-(vinyloxyisopropoxy ethoxy) isopropyl, (meth)acrylic acid 2-(vinyloxyisopropoxy isopropoxy) isopropyl, (meth)acrylic acid 2-(vinyloxyethoxy ethoxy ethoxy) ethyl, and (meth)acrylic acid 2-(vinyloxyethoxy ethoxy ethoxy ethoxy) ethyl are included. One of them is independently used, or two or more thereof are used in combination.

Among them, from the same viewpoint as that described above, (meth)acrylic acid 2-(vinyloxyethoxy) ethyl, that is, at least any one of acrylic acid 2-(vinyloxyethoxy) ethyl and methacrylic acid 2-(vinyloxyethoxy) ethyl is preferable, and acrylic acid 2-(vinyloxyethoxy) ethyl is more preferable. Both acrylic acid 2-(vinyloxyethoxy) ethyl and methacrylic acid 2-(vinyloxyethoxy) ethyl have a simple structure and a small molecular weight, and thus it is possible to remarkably decrease a viscosity of the ink composition. As (meth)acrylic acid 2-(vinyloxyethoxy) ethyl, (meth)acrylic acid 2-(2-vinyloxyethoxy) ethyl and (meth)acrylic acid 2-(1-vinyloxyethoxy) ethyl are included, and as acrylic acid 2-(vinyloxyethoxy) ethyl, acrylic acid 2-(2-vinyloxyethoxy) ethyl and acrylic acid 2-(1-vinyloxyethoxy) ethyl are included. Furthermore, acrylic acid 2-(vinyloxyethoxy) ethyl is more excellent than methacrylic acid 2-(vinyloxyethoxy) ethyl in terms of curing properties.

A content of the polymerizable compound having a vinyl ether group and a (meth)acryloyl group is preferably 10 mass % to 70 mass % with respect to a total amount (100 mass %) of the ink composition, is more preferably 10 mass % to 60 mass %, and is further preferably 10 mass % to 50 mass %. By setting the content to be greater than or equal to 10 mass %, it is possible to decrease a viscosity of the ink composition, and curing properties of the ink composition tends to be more excellent. On the other hand, by setting the content to be less than or equal to 70 mass %, preservation stability of the ink composition and becomes more excellent, and surface gloss of a printed material tend to be more excellent.

The ink composition may include one or two or more of a monofunctional monomer, a bifunctional monomer, and a tri or more multifunctional monomer in addition to the exemplifications. The monomer is not particularly limited, and as the monomer, for example, an unsaturated carboxylic acid such as a (meth)acrylic acid, an itaconic acid, a crotonic acid, an isocrotonic acid, and a maleic acid; a salt of the unsaturated carboxylic acid; ester, urethane, amide, and anhydride of the of unsaturated carboxylic acid; acrylonitrile, styrene, various unsaturated polyesters, unsaturated polyethers, unsaturated polyamides, and unsaturated urethanes are included.

A monofunctional oligomer, a bifunctional oligomer, and a tri or more multifunctional oligomer are not particularly limited, and as the oligomer, for example, an oligomer formed of the above-described monomers such as a linear acryl oligomer, epoxy (meth)acrylate, oxetane (meth)acrylate, aliphatic urethane (meth)acrylate, aromatic urethane (meth)acrylate, and polyester (meth)acrylate are included.

In addition, as other monofunctional monomers or multifunctional monomers, an N-vinyl compound may be included. The N-vinyl compound is not particularly limited, and as the N-vinyl compound, for example, N-vinyl formamide, N-vinyl carbazole, N-vinyl acetamide, N-vinyl pyrrolidone, N-vinyl caprolactam, and acryloyl morpholine, and derivatives thereof are included.

The ink composition may include monofunctional (meth)acrylate as the monofunctional monomer. In this case, a viscosity of the ink composition decreases, and thus solubility of an additive agent other than the photopolymerization initiator is excellent, and discharge stability at the time of performing ink jet recording is easily obtained. The monofunctional (meth)acrylate is not particularly limited, and as the monofunctional (meth)acrylate, for example, monofunctional (meth)acrylate having an aromatic ring such as benzyl (meth)acrylate, 1-naphthyl (meth)acrylate, 2-naphthyl (meth)acrylate, EO cresol (meth)acrylate, ethoxylated phenyl (meth)acrylate, nonylphenoxy polyethylene glycol (meth)acrylate, nonylphenoxy polypropylene glycol (meth)acrylate, paracumylphenoxy ethylene glycol (meth)acrylate, ECH modified phenoxy (meth)acrylate, phenoxy ethyl (meth)acrylate, phenoxy diethylene glycol (meth)acrylate, phenoxy hexaethylene glycol (meth)acrylate, phenoxy tetraethylene glycol (meth) acrylate, tribromophenyl (meth)acrylate, EO modified tribromophenyl (meth)acrylate, O-phenylphenol (meth) acrylate, 2-hydroxy-3-phenoxy propyl (meth)acrylate, and O-phenylphenol EO modified (meth)acrylate is included. Among them, phenoxy ethyl (meth)acrylate is particularly preferable. The ink composition of this embodiment includes the monofunctional (meth)acrylate having an aromatic ring, and thus it is possible to further increase preservation stability. One of the monofunctional (meth)acrylates having an aromatic ring is independently used, or two or more thereof are used in combination.

A content of the monofunctional (meth)acrylate having an aromatic ring is preferably 3.0 mass % to 55 mass % with respect to the total amount of the ink composition, and is more preferably 5.0 mass % to 50 mass %. By setting the content in the range described above, it is possible to make preservation stability and curing properties compatible at a higher level.

In addition, as other monofunctional (meth)acrylate, for example, isoamyl (meth)acrylate, stearyl (meth)acrylate, lauryl (meth)acrylate, oxtyl (meth)acrylate, decyl (meth)acrylate, isomyristyl (meth)acrylate, isostearyl (meth) acrylate, 2-ethylhexyl-diglycol (meth) acrylate, 2-hydroxybutyl (meth)acrylate, butoxyethyl (meth)acrylate, ethoxydiethylene glycol (meth) acrylate, methoxydiethylene glycol (meth) acrylate, methoxypolyethylene glycol (meth) acrylate, methoxypropylene glycol (meth) acrylate, tetrahydrofurfuryl (meth) acrylate, isobornyl (meth) acrylate, 2-hydroxyethyl (meth) acrylate, 2-hydroxypropyl (meth)acrylate, lactone modifiable (meth)acrylate, t-butyl cyclohexyl (meth) acrylate, dicyclopentanyl (meth) acrylate, dicyclopentenyl oxyethyl (meth)acrylate, 2-(isopropenoxy ethoxy) ethyl (meth)acrylate, 2-(isopropenoxy ethoxyethoxy) ethyl (meth) acrylate, 2-(isopropenoxy ethoxy ethoxy ethoxy) ethyl (meth)acrylate, 2-(isopropenoxy ethoxy ethoxy ethoxy ethoxy) ethyl (meth)acrylate, polyethylene glycol monovinyl ether (meth)acrylate, and polypropylene glycol monovinyl ether (meth)acrylate are included.

A content of the monofunctional monomer is preferably 30 mass % to 85 mass % with respect to the total amount (100 mass %) of the ink composition, and is more preferably 40 mass % to 75 mass %. By setting the content to be in the preferred range described above, curing properties, initiator solubility, preservation stability, and discharge stability tend to be more excellent.

The ink composition may include multifunctional (meth)acrylate as the multifunctional monomer. Bifunctional (meth)acrylate is not particularly limited, an as the bifunctional (meth)acrylate, for example, triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, ethylene oxide (EO) adduct di(meth)acrylate of bisphenol A, propylene oxide (PO) adduct di(meth)acrylate of bisphenol A, hydroxypivalic acid neopentyl glycol di(meth)acrylate, polytetramethylene glycol di(meth)acrylate, diethylene glycol di(meth)acrylate, and triethylene glycol di(meth)acrylate are included.

In addition, as tri or more (meth)acrylate, For example, trimethylolpropane tri(meth)acrylate, EO modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerin propoxy tri(meth)acrylate, caprolactone modified trimethylolpropane tri(meth)acrylate, pentaerythritolethoxy tetra(meth)acrylate, and caprolactam modified dipentaerythritol hexa(meth)acrylate are included.

Among them, dipropylene glycol di(meth)acrylate, tripropylene glycol di(meth)acrylate, diethylene glycol di(meth)acrylate, triethylene glycol di(meth)acrylate, and pentaerythritol tri(meth)acrylate are preferable, and dipropylene glycol di(meth)acrylate and pentaerythritol tri(meth)acrylate are more preferable.

A content of the multifunctional monomer is preferably 5 mass % to 60 mass % with respect to the total amount (100 mass %) of the ink composition, is more preferably 10 mass % to 50 mass %, and is further preferably 15 mass % to 40 mass %. By setting the content to be in the preferred range described above, curing properties, preservation stability, discharge stability, and surface gloss of the printed material tend to be more excellent.

In addition, in order to increase toughness, heat resistance, and chemical resistance of a cured film, it is preferable that the monofunctional (meth)acrylate and the bifunctional (meth)acrylate are used together, and among them, it is more preferable that phenoxy ethyl (meth)acrylate and dipropylene glycol di(meth)acrylate are used together.

A content of the polymerizable compound is preferably 35 mass % to 95 mass % with respect to the total amount (100 mass %) of the ink composition, 45 mass % to 90 mass %. By setting the content of the polymerizable compound to be in the range described above, it is possible to further decrease a viscosity and odor, and it is possible to make solubility of the photopolymerization initiator and surface gloss of the reactive printed material more excellent.

Moisture

The ink composition of this embodiment includes moisture, and an amount of water is greater than or equal to 0.05 mass % and less than or equal to 1.0 mass % with respect to the total amount (100 mass %) of the ink composition. Accordingly, it is possible to make preservation stability and curing properties of the ink composition compatible at a high level. Further, it is possible to suppress occurrence of a foreign substance in the ink composition, and it is possible to further suppress aggregation of a pigment at the time of using the pigment as a color material, in particular, aggregation of the pigment at the time of using a dispersing agent together with the pigment, and thus it is possible to further increase discharge stability. In addition, when the ink composition includes an acylphosphine oxide-based photopolymerization initiator, it is possible to preferably dissolve the photopolymerization initiator in the composition. It is preferable that the amount of water is greater than or equal to 0.1 mass % from a viewpoint of further increasing preservation stability and discharge stability of the ink composition, and of further suppressing the occurrence of the foreign substance in the ink composition. On the other hand, from a viewpoint of further suppressing the occurrence of the foreign substance and the aggregation of the pigment, a viewpoint of further increasing preservation stability of the ink composition, and a viewpoint of preferably dissolving the photopolymerization initiator in the ink composition when the ink composition includes the acylphosphine oxide-based photopolymerization initiator, the amount of water is less than or equal to 0.5 mass %.

As a method adjusting the amount of water in the ink composition, for example, a method decreasing an amount of water in each component of the ink composition, for example, in the polymerizable compound, a method eliminating moisture from the composition, a method decreasing an amount of water mixed into the composition at the time of preparing the composition, and the like are included. Among them, as the method decreasing the amount of water in the polymerizable compound, more specifically, a distillation purification method in which the polymerizable compound is subjected to distillation purification, a method in which the polymerizable compound permeates a semi-permeable film through which water selectively permeates, and a method in which water is selectively adsorbed into a water adsorbent adsorbing the water are included. Among them, from a viewpoint of more efficiently and reliably decreasing the amount of water, the distillation purification method is preferable. The amount of water is measured on the basis of a method of the following example.

As the moisture, for example, water such as ion-exchange water, ultrafiltration water, reverse osmosis water, pure water such as distillation water, and ultrapure water from which ionic impurities are maximally eliminated is included. In addition, when water which is sterilized by ultraviolet irradiation or an addition of hydrogen peroxide is used, it is possible to prevent fungus or bacteria from being generated when ink is stored for a long period of time. Accordingly, storage stability tends to be further improved.

The ink composition of this embodiment may include an arbitrary component which is able to be used for an ultraviolet curable ink composition for ink jet of the related art in addition to each of the components described above. As such an arbitrary component, for example, a polymerization initiator, a color material such as a pigment and colorant, a dispersing agent, a polymerization inhibitor, a surfactant agent, a penetrating agent, a moisturizing agent, a dissolution auxiliary agent, a viscosity adjusting agent, a pH adjusting agent, an antioxidizing agent, an antiseptic agent, a mildewproof agent, a corrosion inhibitor, and a chelating agent for capturing metal ions affecting a dispersion, and other additive agents and a solvent are included. One of them is independently used, or two or more thereof are used in combination.

Polymerization Initiator

The ink composition of this embodiment may include a polymerization initiator. The polymerization initiator is not limited insofar as the polymerization initiator generates activated species such as radicals or cations by thermal energy or energy of light such as ultraviolet ray, and initiates a polymerization of the polymerizable compound described above, and as the polymerization initiator, a photopolymerization initiator is preferable, and a photoradical polymerization initiator is preferable. The photoradical polymerization initiator is not particularly limited, and as the photoradical polymerization initiator, an acylphosphine oxide-based photopolymerization initiator and a thioxanthone-based photopolymerization initiator are preferable, and the acylphosphine oxide-based photopolymerization initiator is more preferable.

Acylphosphine Oxide-based Photopolymerization Initiator

It is preferable that the ink composition includes an acylphosphine oxide-based photopolymerization initiator. The acylphosphine oxide-based photopolymerization initiator is easily affected by oxygen inhibition, but is suitable for curing in an LED of long wavelength light. In addition, in the acylphosphine oxide-based photopolymerization initiator, the amount of water in the ink composition is less than or equal to 1.0 mass % the with respect to the total amount of the ink composition, and thus the acylphosphine oxide-based photopolymerization initiator is able to more preferably dissolved in the ink composition.

The acylphosphine oxide-based photopolymerization initiator is not particularly limited, and specifically, as the acylphosphine oxide-based photopolymerization initiator, bis(2,4,6-trimethyl benzoyl)-phenylphosphine oxide, 2,4,6-trimethyl benzoyl-diphenyl-phosphine oxide, and bis-(2,6-dimethoxy benzoyl)-2,4,4-trimethyl pentyl phosphine oxide are included.

A commercialized product of the acylphosphine oxide-based photopolymerization initiator is not particularly limited, and as the commercialized product, for example, IRGACURE 819 (a trade name, manufactured by BASF Societas *Europaea*, bis(2,4,6-trimethyl benzoyl)-phenylphosphine oxide), IRGACURE TPO (a trade name, manufactured by BASF Societas *Europaea*, 2,4,6-trimethyl benzoyl-diphenyl-phosphine oxide), and DAROCUR TPO (a trade name, manufactured by BASF Societas *Europaea*, 2,4,6-trimethyl benzoyl-diphenyl-phosphine oxide) are included.

A content of the acylphosphine oxide-based photopolymerization initiator is preferably 3.0 mass % to 15 mass % with respect to the total amount (100 mass %) of the ink composition, is more preferably 1.0 mass % to 10 mass %, and is further preferably 2.0 mass % to 8.0 mass %. By setting the content to be greater than or equal to 3.0 mass %, curing properties tend to be more excellent. In addition, by setting the content to be less than or equal to 15 mass %, dissolution or preservation stability of solid is maintained to be excellent, and reliability tends to be more excellent.

Thioxanthone-Based Photopolymerization Initiator

The ink composition may include a thioxanthone-based photopolymerization initiator. The ink composition includes the thioxanthone-based photopolymerization initiator, and thus it is possible to decrease surface tackiness, and in particular, it is possible to prevent color mixture and ooze between dots by curing an ink surface at the time of forming a thin film which is easily affected by oxygen inhibition. In addition, it is preferable that the acylphosphine oxide-based photopolymerization initiator and the thioxanthone-based photopolymerization initiator are used because the color mixture and the ooze between dots are excellently prevented by a curing process using an UV-LED, and curing properties and adhesiveness of the ink composition tend to be more excellent.

The thioxanthone-based photopolymerization initiator is not particularly limited, and specifically, as the thioxanthone-based photopolymerization initiator, a thioxanthone-based photopolymerization initiator including at least one selected from a group consisting of thioxanthone, diethylthioxanthone, isopropyl thioxanthone, and chlorothioxanthone is preferable. Furthermore, it is not particularly limited, but as diethylthioxanthone, 2,4-diethylthioxanthone is preferable, as isopropyl thioxanthone, 2-isopropyl thioxanthone is preferable, and as chlorothioxanthone, 2 chlorothioxanthone is preferable. According to the ink composition including such a thioxanthone-based photopolymerization initiator, curing properties, preservation stability, and discharge stability tend to be more excellent. Among them, the thioxanthone-based photopolymerization initiator including diethylthioxanthone is preferable. The thioxanthone-based photopolymerization initiator includes diethylthioxanthone, and thus it is possible to more efficiently convert ultraviolet light (UV light) in a wide region into activated species.

A commercialized product of the thioxanthone-based photopolymerization initiator is not particularly limited, and specifically, as the commercialized product, Speedcure DETX (2,4-diethylthioxanthone), Speedcure ITX (2-isopropyl thioxanthone)(manufactured by Lambson Ltd.), and KAYACURE DETX (2,4-diethylthioxanthone)(manufactured by Nippon Kayaku Co., Ltd.) are included.

A content of the thioxanthone-based photopolymerization initiator is preferably 0.5 mass % to 5.0 mass % with respect to the total amount (100 mass %) of the ink composition, and is more preferably 1.0 mass % to 4.0 mass %. By setting the content to be greater than or equal to 0.5 mass %, it is possible to further decrease surface tackiness, and it is possible to prevent color mixture and ooze between dots by curing an ink surface at the time of forming a thin film which is easily affected by oxygen inhibition. In addition, by setting the content to be less than or equal to 5.0 mass %, coloring of ink due to the initiator itself decreases, yellowing of a color phase decreases, and adhesiveness of a cured film tends to be more excellent.

Other Photopolymerization Initiator

The ink composition may further include one or two or more of a photoradical polymerization initiator other than the photoradical polymerization initiator described above or a photocationic polymerization initiator. As the other photoradical polymerization initiator, for example, aromatic ketones, an aromatic onium salt compound, organic peroxide, a thiocompound (a compound having a thiophenyl group or the like), an α-aminoalkylphenone compound, a hexaaryl biimidazole compound, a ketoxime ester compound, a borate compound, an azinium compound, a metallocene compound, an active ester compound, a compound having a carbon-halogen bond, and an alkyl amine compound are included.

A commercialized product of the other photoradical polymerization initiator is not particularly limited, and as the commercialized product, for example, IRGACURE 651 (2,2-dimethoxy-1,2-diphenylethane-1-one), IRGACURE 184 (1-hydroxy-cyclohexyl-phenyl-ketone), DAROCUR 1173 (2-hydroxy-2-methyl-1-phenyl-propane-1-one), IRGACURE 2959 (1-[4-(2-hydroxy ethoxy)-phenyl]-2-hydroxy-2-methyl-1-propane-1-one), IRGACURE 127 (2-hydroxy-1-{4-[4-(2-hydroxy-2-methyl-propionyl)-benzyl] phenyl}-2-methyl-propane-1-one}, IRGACURE 907 (2-methyl-1-(4-methylthiophenyl)-2-morpholinopropane-1-one), IRGACURE 369 (2-benzyl-2-dimethylamino-1-(4-morpholinophenyl)-butanone-1), IRGACURE 379 (2-(dimethyl amino)-2-[(4-methyl phenyl) methyl]-1-[4-(4-monopholinyl) phenyl]-1-butanone), IRGACURE 784 (bis (η5-2,4-cyclopentadiene-1-yl)-bis(2,6-difluoro-3-(1H-pyrrole-1-yl)-phenyl) titanium), IRGACURE OXE 01 (1.2-octanedione, 1-[4-(phenylthio)-,2-(O-benzoyloxime)]), IRGACURE OXE 02 (ethanone, 1-[9-ethyl-6-(2-methyl-benzoyl)-9H-carbazole-3-yl]-,1-(O-acetyloxime)), IRGACURE 754 (a mixture of an oxyphenylacetic acid, 2-[2-oxo-2-phenylacetoxy ethoxy]ethylester, an oxyphenylacetic acid, and 2-(2-hydroxyethoxy) ethylester) (manufactured by BASF Societas *Europaea*), Speedcure TPO (manufactured by Lambson Ltd.), Lucirin TPO, LR8893, LR8970 (manufactured by BASF Societas *Europaea*), and Ubecryl P36 (manufactured by UCB Co. Ltd.) are included.

The other photocationic polymerization initiator is not particularly limited, and specifically, as the other photocationic polymerization initiator, a sulfonium salt and an iodonium salt are included.

A content of the photopolymerization initiator is preferably 5 mass % to 20 mass % with respect to the total amount (100 mass %) of the ink composition. By setting the content to be in the range described above, an ultraviolet ray curing speed is sufficiently obtained, and it is possible to prevent the photopolymerization initiator from remaining as an undissolved residue or coloring due to the photopolymerization initiator.

Color Material

A color material is not particularly limited, and as the color material, for example, a pigment and a colorant are included.

As the pigment, for example, and inorganic pigment and an organic pigment are included. The inorganic pigment is not particularly limited, and for example, carbon blacks (C.I. Pigment Black 7) such as furnace black, lamp black, acetylene black, and channel black, iron oxide, and titanium oxide are included.

The organic pigment is not particularly limited, and for example, a quinacridone-based pigment, a quinacridonequinone-based pigment, a dioxadiene-based pigment, a phthalocyanine-based pigment, an anthrapyrimidine-based pigment, an anthanthrone-based pigment, an indanthrone-based pigment, a flavanthrone-based pigment, a perylene-based pigment, a diketopyrrolopyrrole-based pigment, a perinone-based pigment, a quinophthalone-based pigment, an anthraquinone-based pigment, a thioindigo-based pigment, a benzimidazolone-based pigment, an isoindolinone-based pigment, an azomethine-based pigment, and an azo-based pigment are included.

One of the pigments is independently used, or two or more thereof are used in combination.

A content of the pigment is preferably 0.1 mass % to 15 mass % with respect to the total amount (100 mass %) of the ink composition, is more preferably 0.5 mass % to 10 mass %, and further preferably 1.0 mass % to 5.0 mass %. By setting the content of the pigment to be in the range described above, color developing properties tend to be more excellent.

The colorant is not particularly limited, and as the colorant, an acidic colorant, a direct colorant, a reactive colorant, and a basic colorant are able to be used. As the colorant, for example, C.I. Acid Yellow 17, 23, 42, 44, 79, 142, C.I. Acid Red 52, 80, 82, 249, 254, 289, C.I. Acid Blue 9, 45, 249, C.I. Acid Black 1, 2, 24, 94, C.I. Food Black 1, 2, C.I. Direct Yellow 1, 12, 24, 33, 50, 55, 58, 86, 132, 142, 144, 173, C.I.

Direct Red 1, 4, 9, 80, 81, 225, 227, C.I. Direct Blue 1, 2, 15, 71, 86, 87, 98, 165, 199, 202, C.I. Direct Black 19, 38, 51, 71, 154, 168, 171, 195, C.I. Reactive Red 14, 32, 55, 79, 249, and C.I. Reactive Black 3, 4, 35 are included.

One of colorants is independently used, or two or more thereof are used in combination.

A content of the colorant is preferably 1.0 mass % to 20 mass % with respect to the total amount (100 mass %) of the ink composition from a viewpoint of obtaining excellent shielding properties and color reproducibility.

Dispersing Agent

When the ink composition includes the pigment, dispersing properties of the pigment becomes more excellent, and thus the composition may further include one or two or more dispersing agents. The dispersing agent is not particularly limited, and as the dispersing agent, for example, a dispersing agent which is commonly used for preparing a pigment dispersion liquid such as a high molecular dispersing agent is included. As a specific example thereof, a dispersing agent including at least one of polyoxyalkylene polyalkylene polyamine, a vinyl-based polymer and copolymer, an acryl-based polymer and copolymer, polyester, polyamide, polyimide, polyurethane, an amino-based polymer, a silicon-containing polymer, a sulfur-containing polymer, a fluorine-containing polymer, and an epoxy resin as a main component is included. As a commercialized product of the high molecular dispersing agent, Ajisper series manufactured by Ajinomoto Fine-Techno Co., Inc., Solsperse series (for example, "Solsperse 36000") manufactured by Nitto Denko Avecia Inc. and Noveon Inc., DisperBYK series manufactured by BYK-Chemie HmbH, and Disparlon series manufactured by Kusumoto Chemicals, Ltd. are included.

Polymerization Inhibitor

The ink composition may include one or two or more polymerization inhibitors from a viewpoint of further increasing preservation stability or the like. The polymerization inhibitor is not particularly limited, and as the polymerization inhibitor, for example, a hindered amine compound such as a compound having a 2,2,6,6-tetramethylpiperidine-N-oxyl skeleton, a compound having a 2,2,6,6-tetramethylpiperidine skeleton, a compound having a 2,2,6,6-tetramethylpiperidine-N-alkyl skeleton, and a compound having a 2,2,6,6-tetramethylpiperidine-N-acyl skeleton; p-methoxyphenol, hydroquinone monomethyl ether (MEHQ), hydroquinone, cresol, t-butyl catechol, 3,5-di-t-butyl-4-hydroxy toluene, 2,2'-methylene bis(4-methyl-6-t-butylphenol), 2,2'-methylene bis(4-ethyl-6-butylphenol), and 4,4'-thiobis(3-methyl-6-t-butylphenol) are included.

The ink composition of this embodiment is stored in a storage body. In other words, the storage body of this embodiment stores the ink composition of this embodiment.

Storage Body

An aspect of the storage body of this embodiment is not limited to the following aspects, and as the aspect of the storage body, for example, an ink cartridge, a pack, a bottle, a tank, a pin, and a can are included. Among them, an ink cartridge, a pack, a bottle, and a tank are preferable because they are generalized and easily control a moisture vapor transmission rate described later such that the rate becomes a desired value, and a pack is more preferable. In addition, as the container filled with the ink composition of the storage body (in the storage body, a member which is filled with the composition and substantially maintains the ink composition), the storage body including the container (the pack) using a flexible film is preferable from a point of a weight reduction, of easily putting the container into a box-like storage body, of easily change a volume of the container according to a residual quantity of the ink composition, and of using a film by performing thermal fusion (heat sealing) with respect to the film and by processing the film into the shape of a sac.

Furthermore, as a usage mode of the storage body of this embodiment, at least (A) a configuration of an ink cartridge or the like which is separated from a recording device and is mounted on the recording device, and sequentially supplies the ink composition to the recording device, (B) a configuration which is separated from the recording device, and moves only the ink composition from the storage body to the recording device at the time of using the ink composition, and (C) a configuration of a tank or the like which is provided in the recording device in advance, and stores the ink composition are included.

(A) and (B) described above are able to be the storage body of the ink composition immediately before the ink composition is supplied (moved) to the recording device after the storage body is shipped out. (C) described above is able to be the storage body of the ink composition before a use of an initial ink composition is initiated by the recording device after the recording device is shipped out. Furthermore, in a state where the ink composition is supplied to the recording device from the container through a connection portion such as an ink tube, (A) and (C) described above are able to be the storage body of the ink composition performing printing of the recording device. In addition, (B) described above is able to be the storage body of the ink composition performing printing by the recording device after moving the ink composition to the recording device from the storage body. Furthermore, in (B) described above, as a target to which the ink composition is moved, a tank provided in the recording device or the like is included.

A configuration material of the container which is filled with the ink composition is not limited to the following materials, and as the configuration material, for example, polyethylene terephthalate (PET), polypropylene (PP), polyethylene, an ethylene vinyl acetate copolymer, an ethylene vinyl alcohol copolymer (EVOH), and polystyrene are included, and a film thereof may be included. The above-described materials may be mixed at a suitable ratio, or a plurality thereof may be overlapped with each other. In case of the film, the film may be obtained by being laminated. When a plurality of films are overlapped with each other, it is necessary that all of the plurality of films are the film described above, and a part thereof may be a film configured of other materials, for example, metal and a metal compound.

In addition, from a viewpoint of increasing flexibility of the container, it is preferable that a plasticizing agent is included as the configuration material of the container. As the plasticizing agent, for example, fatty acid ester, an epoxy compound, and a polyester compound are included. Among them, from a point of general-purpose properties of the plasticizing agent, fatty acid ester is preferable, and as the fatty acid ester, for example, phthalic acid ester, adipic acid ester, trimellitic acid ester, and citric acid ester are included. One of the fatty acid esters is independently used, or two or more thereof are used in combination.

The storage body may be stirred during keeping and transporting in order to prevent the component included in the ink composition from being settled out. After settling out the component in the ink composition, when a long period of time has elapsed, a precipitate becomes a cake, and thus it may be difficult to prevent the precipitate from being a cake. In addition, when the ink composition is supplied to the recording device from the storage body, it is preferable that the storage body is stirred in order to prevent the component from being settled out.

When the container is a container (a pack) using a flexible film, in particular, durability is necessary without having a crack or a break according to a stirring operation. As a film material having excellent durability, for example, a plastic film of polyethylene terephthalate (PET), polypropylene, polyethylene, an ethylene vinyl acetate copolymer, an ethylene vinyl alcohol copolymer, polystyrene, and the like is preferably included, and a plastic film of an ethylene vinyl acetate copolymer is more preferable. As the film, an extended plastic film of polyethylene, polypropylene, an ethylene-vinyl alcohol copolymer, polystyrene, and the like which have high density, low density, or linear low density is preferably included. The film may be a laminated film in which multilayered films are joined to each other.

In addition, the storage body further includes a sealing member, and the container which filled with at least the ink composition may be sealed by being stored in the sealing member (hereinafter, particularly referred to as a "sealing storage body"). That is, the sealing storage body of this embodiment is a sealing storage body including a container, the ink composition which fills the inside of the container, and a sealing member which stores and fills at least the container. A configuration material of the sealing member in the sealing storage body is not particularly limited, and may be identical to the configuration material of the storage body or the container. Furthermore, when the storage body includes the sealing member, at least the container may be stored and sealed in the sealing member, and for example, a part of the storage body other than the container may be stored and sealed in the sealing member, or the entire storage body may be stored and sealed in the sealing member. In addition, an aspect of the sealing member is not particularly limited, and when the entire storage body is stored, it is possible to decrease the size of the sealing storage body, and from a viewpoint of maintaining sealing properties of the sealing member itself, a sac formed of a flexible film which is able to be adhered to the storage body according to the outline of the storage body is preferable. In addition, similarly, when a part of the storage body of the container or the like is stored, from a viewpoint of decreasing the size of a part to be stored, a sac formed of a flexible film which is able to be adhered to a part to be stored according to the outline of a part to be stored is preferable.

In a case where the container is the pack described above, or in a case where the sealing member is the sac formed of the film described above, when the component included in the ink composition is settled out or the like, the settled component may be recovered by horizontally vibrating the pack or the sealing storage body and stirring ink. In this case, from a point of preventing a crack or a break of the pack or the sac from occurring, it is preferable that a plasticizing agent is included as a configuration material of the pack or the sac. As the plasticizing agent, any one described above is included, and fatty acid ester is preferable.

When a member configuring the container, for example, the container is the pack, a moisture vapor transmission rate of the film configuring the pack or the sealing member of the sealing storage body, for example, the sac formed of the film is preferably less than or equal to 30 g/m$^2$·24 hrs, is more preferably less than or equal to 15 g/m$^2$·24 hrs, is further preferably less than or equal to 10 g/m$^2$·24 hrs, and is particularly preferably less than or equal to 5.0 g/m$^2$·24 hrs. By using the member of which the moisture vapor transmission rate is less than or equal to 30 g/m$^2$·24 hrs, it is possible to suppress an increase in an amount of water in the ink composition filling the inside of the container even when the storage body or the sealing storage body are stored for a long period of time. In order to set the moisture vapor transmission rate to be less than or equal to 30 g/m$^2$·24 hrs, for example, the member configuring the container or the material configuring the sealing member may be selected, or a layer configured of at least one of metal and a metal compound may be disposed on the member. Among them, from a viewpoint of general-purpose properties, it is preferable that the layer configured of at least one of metal and a metal compound is disposed. As the metal, for example, Al and Ti are included. As the metal compound, a metal oxide is preferable, and for example, alumina, silica, titania, and zirconia are included. One of them is independently used, or two or more thereof are used in combination.

A thickness of the film configuring the pack is preferably 50 μm to 200 μm, is more preferably greater than or equal to 70 μm, is further preferably greater than or equal to 80 μm, is preferably less than or equal to 150 μm, and is more preferably less than or equal to 130 μm. The thickness of the film is a total thickness when the film is a laminated film configured of a plurality of layers. It is preferable that the thickness of the film is in the range described above from a point of durability or flexibility of the film.

Here, the moisture vapor transmission rate is a value measured by a thickness corresponding to 100 μm under an environment of 40° C. and relative humidity of 90%, and for example, among materials described in Technology of Transporting and Industrial Packing (an editorial supervision: MIZGUCHI Shinich, published by Fuji Techno System Co., Ltd.), a material satisfying the moisture vapor transmission rate described above is able to be used.

A capacity of the composition which is able to be stored in the storage body is not limited to the following values, and is preferably 100 mL to 5000 mL, an upper limit thereof is more preferably less than or equal to 4000 mL, is further preferably less than or equal to 3000 mL, is particularly preferably less than or equal to 2000 mL, and is most preferably less than or equal to 1000 mL, and a lower limit thereof is preferably greater than or equal to 200 mL, and is further preferably greater than or equal to 500 mL. When the capacity is in the range described above, it is possible to make any one of curing properties, preservation stability, and discharge stability more excellent.

Here, an ink cartridge which is an example of the storage body of this embodiment will be described. FIG. 1 is an exploded perspective view illustrating an ink cartridge 40. The ink cartridge 40 is provided with an ink pack 70 which is filled with ink, and a cartridge case 72 including a main body case 76 and a lid portion 78 in which the ink pack 70 is stored to be protected, the ink pack 70 is provided with an ink supply port 74, the main body case is provided with a cut-out portion 80 and a groove portion 86, and the lid portion 78 is provided with a pressing portion 82 and a hook portion 84. As a material of the ink pack, the materials described above are able to be used. In the ink cartridge 40, the ink pack 70 is stored in the main body case 76 and the lid portion 84, and at this time, the ink supply port 74 is fitted into the cut-out portion 80, and then is fixed by being interposed between the pressing portion 82 and the cut-out portion 80. In addition, the main body case 76 and the lid portion 84 are sealed by fitting the hook portion 84 into the groove portion 86.

Thus, according to this embodiment, it is possible to provide the storage body storing the ink composition which is able to make curing properties and preservation stability compatible at a high level.

Ink Jet Method

An ink jet method of this embodiment includes an attachment step of attaching the composition described above to a discharge target. Hereinafter, as one embodiment of the ink jet method, an ink jet recording method will be described, but the ink jet method may be other than the ink jet recording method. The ink jet recording method generally performs recording by using an ink jet recording device. More specifically, the ink jet recording method includes an attachment step of attaching the ink composition to a recorded medium by discharging the ink composition described above from a nozzle of a head. It is preferable that the ink jet recording method of this embodiment includes an irradiation step of curing the ink composition which is attached to the recorded medium by light irradiation.

Attachment Step

In the attachment step, first, the ink composition of this embodiment is discharged from the nozzle of the head. As a discharge method, a Piezo-type method, a method in which the ink composition is discharged due to foam (bubbles) generated by heating the ink composition, and the like are able to be used. Among them, from a viewpoint of difficulty in transformation of the ink composition, a Piezo-type method is preferable.

The ink composition discharged from the nozzle is attached to the discharge target. As the discharge target, a recorded medium or the like is included. Hereinafter, as one embodiment of the discharge target, the recorded medium will be described, but the discharge target may be other than the recorded medium. As the recorded medium, for example, an absorptive or non-absorptive recorded medium is included. The absorptive recorded medium is not particularly limited, and as the absorptive recorded medium, for example, regular paper such as electrophotographic paper having high permeability of the ink composition, ink jet paper (paper for exclusive use for ink jet including an ink composition absorptive layer formed of silica particles or alumina particles, or an ink composition absorptive layer formed of a hydrophilic polymer such as polyvinyl alcohol (PVA) or polyvinyl pyrrolidone (PVP)), art paper having comparatively low permeability of the ink composition which is used for general offset printing, coated paper, cast-coated paper, and the like are included. In addition, the non-absorptive recorded medium is not particularly limited, and as the non-absorptive recorded medium, for example, a film or a plate of plastics such as polyvinyl chloride, polyethylene, polypropylene, and polyethylene terephthalate (PET), a plate of metals such as iron, silver, copper, and aluminum, or a metal plate manufactured by performing vapor deposition with respect to these various metals or a film formed of plastic, a plate of an alloy such as stainless steel or brass, and the like are included.

Irradiation Step

In the irradiation step, the ink composition attached to the recorded medium is irradiated with light, and thus the polymerizable compound is polymerized, and the ink composition is cured. A light source is not particularly limited insofar as the light source has a light emitting wavelength in an ultraviolet ray wavelength region. Among them, an ultraviolet light emitting diode (UV-LED) and an ultraviolet ray laser diode (UV-LD) having a small size, enhanced life, high efficiency at low cost are expected to be a light source for ultraviolet curable ink jet. Among them, the UV-LED is preferable.

Here, it is preferable to use an ink composition which is able to be cured by being irradiated with light having a light emitting peak wavelength in a range of preferably 360 nm to 450 nm. In addition, it is preferable that irradiation energy is less than or equal to 500 mJ/cm$^2$. According to such an irradiation condition, the ink composition is able to be cured at low energy and a high speed. The irradiation energy is calculated by multiplying an irradiation intensity and an irradiation time. According to a constituent of the ink composition, it is possible to reduce the irradiation time, and it is possible to increase a recording speed. On the other hand, according to the constituent of the ink composition, it is possible to decrease the irradiation intensity, and in this case, a reduction in the size of a device or a reduction in cost is realized. At this time, it is preferable that the UV-LED is used for light irradiation. Such an ink composition is obtained by including a compound having a photoradical polymerization initiator which is decomposed by light irradiation in the wavelength range described above, and a polymerizable functional group which initiates a polymerization by the light irradiation in the wavelength range described above. Furthermore, one light emitting peak wavelength may be in the wavelength range described above, or a plurality of light emitting peak wavelengths may be in the wavelength range described above. Even when the plurality of light emitting peak wavelengths is in the wavelength range described above, the entire irradiation energy of light having the light emitting peak wavelength described above is the irradiation energy described above.

Furthermore, in the ink jet recording method of this embodiment, a heating step of heating the recorded medium may be included in addition to the irradiation step described above. Accordingly, it is possible to heat the ink composition attached to the recorded medium, and it is possible to further increase curing properties.

The ink jet recording method of this embodiment becomes a recording method which is able to make curing properties and discharge stability compatible at a high level by performing the recording by the ink jet method using the ink composition described above.

The ink jet recording device of this embodiment may be used for the ink jet recording method described above, and other configurations using the ink composition of this embodiment are not particularly limited. For example, as the other configuration, a configuration known in the related art may be included.

EXAMPLE

Hereinafter, the first aspect of the invention will be described in detail by using examples and comparative examples. The invention is not limited to the following examples.

Material for Ultraviolet Curable Composition

A main material for an ultraviolet curable composition used in the following examples and comparative examples is as follows.

Color Material

P.I. Pigment Blue 15:4

Polymerizable Compound

VEEA (acrylic acid 2-(2-vinyloxyethoxy) ethyl, manufactured by Nippon Shokubai Co., Ltd., and the number of functional groups: 1)

PEA (phenoxy ethylacrylate, manufactured by Osaka Organic Chemical Industry Ltd., and the number of functional groups: 1)

DPGDA (dipropylene glycol diacrylate, manufactured by Sartomer Company, and the number of functional groups: 2)

SR444 (pentaerythritol triacrylate, manufactured by Nippon Kayaku Co., Ltd., and the number of functional groups: 3)
Polymerization Initiator
IRGACURE TPO (a trade name, manufactured by BASF Societas Europaea, and a solid content of 100 mass %)
IRGACURE 369 (a trade name, manufactured by BASF Societas Europaea, and a solid content of 100 mass %)
KAYACURE DETX (a trade name, manufactured by Nippon Kayaku Co., Ltd., and a solid content of 100 mass %)
Dispersing Agent
Solsperse 36000 (a trade name, manufactured by Lubrizol Corporation)
Polymerization Inhibitor
MEHQ (hydroquinone monomethyl ether, manufactured by Tokyo Chemical Industry Co., Ltd.)

Examples 1 to 20 and Comparative Examples 1 to 9

Preparation of Ultraviolet Curable Composition

The respective materials were mixed at a composition (mass %) shown in the following Tables 1 to 3 and were sufficiently stirred, and thus each ultraviolet curable composition was obtained.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| P.I. Pigment Blue 15:4 | 2.0 | 2.0 | 2.0 | 2.0 | 2.0 | 2.0 | 2.0 | 2.0 | 2.0 |
| Solsperse 36000 | 1.0 | 1.0 | 1.0 | 1.0 | 1.0 | 1.0 | 1.0 | 1.0 | 1.0 |
| VEEA | 20.0 | 20.0 | 20.0 | 20.0 | 20.0 | 20.0 | 20.0 | 20.0 | 20.0 |
| PEA | 35.0 | 35.0 | 35.0 | 35.0 | 35.0 | 35.0 | 35.0 | 35.0 | 35.0 |
| DPGDA | 22.0 | 22.0 | 22.0 | 22.0 | 22.0 | 22.0 | 22.0 | 22.0 | 22.0 |
| SR444 | 7.8 | 7.8 | 7.8 | 7.8 | 7.8 | 7.8 | 7.8 | 7.8 | 7.8 |
| MEHQ | 0.2 | 0.2 | 0.2 | 0.2 | 0.2 | 0.2 | 0.2 | 0.2 | 0.2 |
| Irgacure TPO | 4.0 | 4.0 | 4.0 | 4.0 | 4.0 | 4.0 | 4.0 | 4.0 | 4.0 |
| Irgacure 369 | 6.0 | 6.0 | 6.0 | 6.0 | 6.0 | 6.0 | 6.0 | 6.0 | 6.0 |
| KAYACURE DETX | 2.0 | 2.0 | 2.0 | 2.0 | 2.0 | 2.0 | 2.0 | 2.0 | 2.0 |
| Total | 100 | 100 | 100 | 100 | 100 | 100 | 100 | 100 | 100 |
| Amount of Water | 0.2% | 0.05% | 0.1% | 0.5% | 1.0% | 0.2% | 0.2% | 0.2% | 0.2% |
| Li | 80 | 80 | 80 | 80 | 80 | 80 | — | — | — |
| Na | 100 | 100 | 100 | 100 | 100 | 100 | — | — | — |
| K | 120 | 120 | 120 | 120 | 120 | 120 | — | — | — |
| Ag | 20 | 20 | 20 | 20 | 20 | — | 20 | — | — |
| Mg | 30 | 30 | 30 | 30 | 30 | — | 30 | — | — |
| Ca | 150 | 150 | 150 | 150 | 150 | — | 150 | — | — |
| Ba | 30 | 30 | 30 | 30 | 30 | — | — | 30 | — |
| Zn | 140 | 140 | 140 | 140 | 140 | — | — | 140 | — |
| Fe | 60 | 60 | 60 | 60 | 60 | — | — | 60 | — |
| Sn | 30 | 30 | 30 | 30 | 30 | — | — | — | 30 |
| Al | 40 | 40 | 40 | 40 | 40 | — | — | — | 40 |
| Zr | 60 | 60 | 60 | 60 | 60 | — | — | — | 60 |
| Film of Container | Film 1 | Film 1 | Film 1 | Film 1 | Film 1 | Film 1 | Film 1 | Film 1 | Film 1 |
| Efficiency of Anhydration Step | B | C | B | B | B | B | B | B | B |
| Curing Properties | A | A | A | A | B | A | A | A | A |
| Discharge Stability | A | A | A | A | A | A | A | A | A |
| Preservation Stability | A | B | A | A | A | A | A | A | A |
| Durability of Storage Body | A | A | A | A | A | A | A | A | A |

TABLE 2

|  | Example 10 | Example 11 | Example 12 | Example 13 | Example 14 | Example 15 |
|---|---|---|---|---|---|---|
| P.I. Pigment Blue 15:4 | 2.0 | 2.0 | 2.0 | 2.0 | 2.0 | 2.0 |
| Solsperse 36000 | 1.0 | 1.0 | 1.0 | 1.0 | 1.0 | 1.0 |
| VEEA | 20.0 | 20.0 | 20.0 | 20.0 | 20.0 | 20.0 |
| PEA | 35.0 | 35.0 | 35.0 | 35.0 | 35.0 | 35.0 |
| DPGDA | 22.0 | 22.0 | 22.0 | 22.0 | 22.0 | 22.0 |
| SR444 | 7.8 | 7.8 | 7.8 | 7.8 | 7.8 | 7.8 |
| MEHQ | 0.2 | 0.2 | 0.2 | 0.2 | 0.2 | 0.2 |
| Irgacure TPO | 4.0 | 4.0 | 4.0 | 4.0 | 4.0 | 4.0 |
| Irgacure 369 | 6.0 | 6.0 | 6.0 | 6.0 | 6.0 | 6.0 |
| KAYACURE DETX | 2.0 | 2.0 | 2.0 | 2.0 | 2.0 | 2.0 |
| Total | 100 | 100 | 100 | 100 | 100 | 100 |
| Amount of Water | 0.2% | 0.2% | 0.05% | 0.2% | 1.0% | 0.2% |
| Li | — | — | — | — | — | 80 |
| Na | — | — | — | — | — | 100 |
| K | — | — | — | — | — | 120 |
| Ag | — | 10 | — | — | — | 20 |
| Mg | — | — | — | — | — | 30 |
| Ca | — | — | — | — | — | 250 |
| Ba | — | — | — | — | — | 30 |
| Zn | 10 | — | — | — | — | 140 |
| Fe | — | — | 10 | 10 | 10 | 60 |
| Sn | — | — | — | — | — | 30 |

TABLE 2-continued

| | | | | | | |
|---|---|---|---|---|---|---|
| Al | — | — | — | — | — | 40 |
| Zr | — | — | — | — | — | 60 |
| Film of Container | Film 1 | Film 1 | Film 1 | Film 1 | Film 1 | Film 1 |
| Efficiency of Anhydration Step | B | B | C | B | B | B |
| Curing Properties | B | B | B | B | C | A |
| Discharge Stability | A | A | A | A | A | B |
| Preservation Stability | A | A | B | A | A | B |
| Durability of Storage Body | A | A | A | A | A | A |

| | | Example 16 | Example 17 | Example 18 | Example 19 | Example 20 |
|---|---|---|---|---|---|---|
| | P.I. Pigment Blue 15:4 | 2.0 | 2.0 | 2.0 | 2.0 | 2.0 |
| | Solsperse 36000 | 1.0 | 1.0 | 1.0 | 1.0 | 1.0 |
| | VEEA | 20.0 | 20.0 | 20.0 | 20.0 | 20.0 |
| | PEA | 35.0 | 35.0 | 35.0 | 35.0 | 35.0 |
| | DPGDA | 22.0 | 22.0 | 22.0 | 22.0 | 22.0 |
| | SR444 | 7.8 | 7.8 | 7.8 | 7.8 | 7.8 |
| | MEHQ | 0.2 | 0.2 | 0.2 | 0.2 | 0.2 |
| | Irgacure TPO | 4.0 | 4.0 | 4.0 | 4.0 | 4.0 |
| | Irgacure 369 | 6.0 | 6.0 | 6.0 | 6.0 | 6.0 |
| | KAYACURE DETX | 2.0 | 2.0 | 2.0 | 2.0 | 2.0 |
| | Total | 100 | 100 | 100 | 100 | 100 |
| | Amount of Water | 0.2% | 0.05% | 0.2% | 1.0% | 0.20% |
| | Li | — | 80 | 80 | 80 | 80 |
| | Na | — | 250 | 250 | 250 | 250 |
| | K | — | 120 | 120 | 120 | 120 |
| | Ag | 20 | 20 | 20 | 20 | 20 |
| | Mg | 30 | 30 | 30 | 30 | 30 |
| | Ca | 250 | 250 | 250 | 250 | 250 |
| | Ba | — | 30 | 30 | 30 | 30 |
| | Zn | — | 140 | 140 | 140 | 140 |
| | Fe | — | 60 | 60 | 60 | 60 |
| | Sn | — | 30 | 30 | 30 | 30 |
| | Al | — | — | — | — | — |
| | Zr | — | — | — | — | — |
| | Film of Container | Film 1 | Film 1 | Film 1 | Film 1 | Film 2 |
| | Efficiency of Anhydration Step | B | B | B | B | B |
| | Curing Properties | A | A | A | B | A |
| | Discharge Stability | B | B | B | B | A |
| | Preservation Stability | B | C | B | B | B |
| | Durability of Storage Body | A | A | A | A | D |

TABLE 3

| | Comparative Example 1 | Comparative Example 2 | Comparative Example 3 | Comparative Example 4 | Comparative Example 5 |
|---|---|---|---|---|---|
| P.I. Pigment Blue 15:4 | 2.0 | 2.0 | 2.0 | 2.0 | 2.0 |
| Solsperse 36000 | 1.0 | 1.0 | 1.0 | 1.0 | 1.0 |
| VEEA | 20.0 | 20.0 | 20.0 | 20.0 | 20.0 |
| PEA | 35.0 | 35.0 | 35.0 | 35.0 | 35.0 |
| DPGDA | 22.0 | 22.0 | 22.0 | 22.0 | 22.0 |
| SR444 | 7.8 | 7.8 | 7.8 | 7.8 | 7.8 |
| MEHQ | 0.2 | 0.2 | 0.2 | 0.2 | 0.2 |
| Irgacure TPO | 4.0 | 4.0 | 4.0 | 4.0 | 4.0 |
| Irgacure 369 | 6.0 | 6.0 | 6.0 | 6.0 | 6.0 |
| KAYACURE DETX | 2.0 | 2.0 | 2.0 | 2.0 | 2.0 |
| Total | 100 | 100 | 100 | 100 | 100 |
| Amount of Water | 0.2% | 1.5% | 0.2% | 0.2% | 0.02% |
| Li | 5 | 5 | 80 | 350 | 80 |
| Na | 4 | 4 | 100 | 100 | 100 |
| K | 3 | 3 | 120 | 120 | 120 |
| Ag | — | — | 20 | 20 | 20 |
| Mg | — | — | 30 | 30 | 30 |
| Ca | 8 | 8 | 350 | 150 | 150 |
| Ba | — | — | 30 | 30 | 30 |
| Zn | 6 | 6 | 140 | 140 | 140 |
| Fe | — | — | 60 | 60 | 60 |
| Sn | — | — | 30 | 30 | 30 |
| Al | — | — | 40 | 40 | 40 |

TABLE 3-continued

|  |  |  |  |  |
|---|---|---|---|---|
| Zr | — | — | 60 | 60 | 60 |
| Film of Container | Film 1 | Film 1 | Film 1 | Film 1 | Film 1 |
| Efficiency of Anhydration Step | B | B | B | D | D |
| Curing Properties | D | D | A | A | A |
| Discharge Stability | A | A | D | D | A |
| Preservation Stability | A | A | C | A | D |
| Durability of Storage Body | A | A | A | A | A |

|  | Comparative Example 6 | Comparative Example 7 | Comparative Example 8 | Comparative Example 9 |
|---|---|---|---|---|
| P.I. Pigment Blue 15:4 | 2.0 | 2.0 | 2.0 | 2.0 |
| Solsperse 36000 | 1.0 | 1.0 | 1.0 | 1.0 |
| VEEA | 20.0 | 20.0 | 20.0 | 20.0 |
| PEA | 35.0 | 35.0 | 35.0 | 35.0 |
| DPGDA | 22.0 | 22.0 | 22.0 | 22.0 |
| SR444 | 7.8 | 7.8 | 7.8 | 7.8 |
| MEHQ | 0.2 | 0.2 | 0.2 | 0.2 |
| Irgacure TPO | 4.0 | 4.0 | 4.0 | 9.0 |
| Irgacure 369 | 6.0 | 6.0 | 6.0 | 1.0 |
| KAYACURE DETX | 2.0 | 2.0 | 2.0 | 2.0 |
| Total | 100 | 100 | 100 | 100 |
| Amount of Water | 0.02% | 1.5% | 1.5% | 1.5% |
| Li | 80 | 80 | 80 | 80 |
| Na | 100 | 100 | 250 | 100 |
| K | 120 | 120 | 120 | 120 |
| Ag | 20 | 20 | 20 | 20 |
| Mg | 30 | 30 | 30 | 30 |
| Ca | 350 | 150 | 250 | 150 |
| Ba | 30 | 30 | 30 | 30 |
| Zn | 140 | 140 | 140 | 140 |
| Fe | 60 | 60 | 60 | 60 |
| Sn | 30 | 30 | 30 | 30 |
| Al | 40 | 40 | 40 | 40 |
| Zr | 60 | 60 | 60 | 60 |
| Film of Container | Film 1 | Film 1 | Film 1 | Film 1 |
| Efficiency of Anhydration Step | B | B | B | B |
| Curing Properties | A | D | D | C |
| Discharge Stability | B | C | D | D |
| Preservation Stability | D | A | A | B |
| Durability of Storage Body | A | A | A | A |

Measurement of Amount of Water

An amount of water in the ultraviolet curable composition was measured by a moisture meter (manufactured by Hiranuma Sangyo Co., Ltd., a product name of "Automatic Heated and Vaporized Moisture Measurement System AQS-22010") using a Karl Fischer coulometry analysis. Results are shown in Tables 1 to 3 (a mass basis).

Measurement of Content of Metal Element

A content of each metal element in the ultraviolet curable composition was measured by an ICP emission spectral analysis method (an ICP emission spectral analysis device, manufactured by Hitachi High-Technologies Corporation). Results are shown in Tables 1 to 3 (ppm by mass).

Evaluation of Efficiency of Anhydration Step (Manufacturing Efficiency)

Each polymerizable compound obtained by a general method was distilled and purified by using a rotary evaporator one time. The ultraviolet curable composition was prepared at a composition shown in Table 1 by using VEEA after being distilled and purified, and the amount of water was measured. Until the amount of water is a numerical value shown in Table 1, the distillation and purification, and the preparation of the ultraviolet curable composition, and the measurement of the amount of water were repeated. On the basis of the number of times of the distillation and purification, evaluation was performed as follows. As the number of times of the distillation and purification decreases, efficiency of the anhydration step (manufacturing efficiency) becomes high. Results are shown in Tables 1 to 3.

B: Less than or equal to two times.
C: 3 times to 4 times.
D: Greater than or equal to 5 times.

Evaluation of Curing Properties

The ultraviolet curable composition was applied onto a PET film (PET50A PL Sin (a trade name), manufactured by Lintec Corporation) by using a bar coater, and a film having a thickness of 14 μm was formed. After that, the film was cured by being irradiated with ultraviolet ray having an irradiation intensity of 1100 mW/cm$^2$ and a wavelength of 395 nm. The film which was cured (the cured film) was rubbed with a cotton applicator at a weight of 100 g ten times, and curing energy (irradiation energy) at the time of being flawless was obtained.

Furthermore, the irradiation energy [mJ/cm$^2$] was obtained by measuring an irradiation intensity [mW/cm$^2$] of an irradiated surface emitted from the light source, and by calculating a product of the irradiation intensity and an irradiation continuing time [s]. The irradiation intensity was measured by using an ultraviolet ray intensity meter UM-10, and a light receiving unit UM-400 (manufactured by Konica Minolta Sensing, Inc.). On the basis of a result of the irradiation intensity, curing properties were evaluated on the following evaluation reference. Results are shown in Tables 1 to 3.
A: Less than or equal to 250 mJ/cm$^2$
B: Greater than 250 mJ/cm$^2$ and less than or equal to 350 mJ/cm$^2$
C: Greater than 350 mJ/cm$^2$ and less than or equal to 400 mJ/cm$^2$
D: Greater than 400 mJ/cm$^2$ Evaluation of Discharge Stability (Suppression of Precipitation of Foreign Substance)

A head including 360 nozzles was fixed to an upper portion, a PET film (commodity number "PET50 K2411 PAT1E", manufactured by Lintec Corporation) was transported to a lower portion of the nozzle of the head at 15 m/min, the ultraviolet curable composition was discharged onto the PET film from 180 nozzles at 10 kHz, and continuous printing was performed. Simultaneously with the printing, the ink composition attached to the PET film was irradiated with light of an LED having a light emitting wavelength peak of 395 nm, and thus an image was formed. It was visually confirmed whether or not the ultraviolet curable composition was discharged from the entire nozzle every 5 minutes from an initial discharge, and discharge stability was evaluated on the following evaluation reference. Results are shown in Tables 1 to 3. In addition, the ultraviolet curable composition was observed by an optical microscope, and it was found that particles having a particle diameter greater than or equal to 3 µm existed in the ultraviolet curable composition of which discharge stability was evaluated as C or D. In contrast, it was not confirmed the existence of the particles having a particle diameter greater than or equal to 3 µm in the ultraviolet curable composition of which discharge stability was evaluated as A or B.
A: Nozzle coming-out did not occur for greater than or equal to 60 minutes.
B: Nozzle coming-out occurred for greater than or equal to 30 minutes and less than 60 minutes.
C: Nozzle coming-out occurred for greater than or equal to 15 minutes and less than 30 minutes.
D: Nozzle coming-out occurred for less than 15 minutes.

Evaluation of Preservation Stability

After the ultraviolet curable composition was stored in a glass bottle, the glass bottle was sealed and stored for two weeks at 60° C. A viscosity of the ultraviolet curable composition at 20° C. before and after keeping was measured by a viscosity meter manufactured by Physica Ltd., and it was calculated that how much (%) the viscosity of the ultraviolet curable composition after keeping was increased from the viscosity of the ultraviolet curable composition before keeping, that is, how much (%) the viscosity of the ultraviolet curable composition after keeping was thickened from the viscosity of the ultraviolet curable composition before keeping. On the basis of the result, preservation stability was evaluated on the following evaluation reference. Results are shown in Tables 1 to 3.
A: Thickened by less than 5%.
B: Thickened by greater than or equal to 5% and less than 10%.
C: Thickened by greater than or equal to 10% and less than 15%.
D: Thickened by greater than or equal to 15%.

Evaluation of Durability of Storage Body

Two films were respectively cut out into the shape of rectangles having the same size, three sides of the rectangular films were heated and sealed, and a pack was prepared. As the film, any one of a film 1 (a material: high density polyethylene, a plasticizing agent: diethyl adipate, and a thickness: 100 µm) and a film 2 (a material: high density polyethylene, a plasticizing agent: none, and a thickness: 100 µm) was used. The pack was filled with the ultraviolet curable composition by 700 mL, and the remaining sides of the rectangular films were heated and sealed, and thus the pack was sealed. An aluminum vapor deposited film (a thickness: 12 µm) was formed outside of the pack, and an aluminum vapor deposited pack filled with the ultraviolet curable composition was obtained. Furthermore, similar to the film described above, a moisture vapor transmission rate of a laminated film which is obtained by forming the aluminum vapor deposited film was measured as 0.5 g/m$^2$·24 hrs. Next, a storage body storing a container (the aluminum vapor deposited pack) in an outer package (a shape: a cuboid, a material: polycarbonate, and a dimension: a length of 10 cm×a width of 30 cm×a height of 4 cm) was obtained, and then the storage body was fixed onto a pedestal in a direction of flat mounting, the pedestal was reciprocated in a distance of 30 cm in a direction of long side of the storage body at a speed of 20 cm/s predetermined number of times. The number of times of reciprocating when an abnormality was confirmed in the container (the aluminum vapor deposited pack) was recorded, and on the basis of the number of times of reciprocating, durability of the storage body was evaluated on the following evaluation reference. Results are shown in Tables 1 to 3.
A: Container was not broken even when reciprocating was performed 1500 times.
D: Container was broken when reciprocating was performed less than 1500 times.

In addition, a pack filled with the ultraviolet curable composition was obtained by the same manner as that in the above description except that the aluminum vapor deposited film was not formed. Furthermore, a moisture vapor transmission rate of the film on which the aluminum vapor deposited film was not formed was measured as 0.40 g/m$^2$·24 hrs. The pack and the aluminum vapor deposited pack of Example 1 were stored for six months under an environment of a temperature of 40° C. and relative humidity of 90%, an amount of water in the ultraviolet curable composition after keeping was measured, and the amount of water was less than or equal to 1 mass % in the aluminum vapor deposited pack of Example 1, but the amount of water exceeded 1% in the pack in which the aluminum vapor deposited film was not formed. Thus, it was found that the moisture vapor transmission rate of the film configuring the pack was preferably less than or equal to 30 g/m$^2$·24 hrs.

By comparing Examples 1 and 6 to 14 with Comparative Examples 1 and 2, it was found that when a content of a specific metal element was greater than or equal to 10 ppm by mass, curing properties became particularly excellent. In addition, by comparing Examples and 15 to 19 with Comparative Examples 3 and 4, it was found that when a content of each specific metal element was less than or equal to 250 ppm by mass, discharge stability (suppression of precipitation of a foreign substance) became particularly excellent, and preservation stability also tended to be excellent. Further, by comparing Examples 1 to 5 with Comparative Examples 5 to 9, it was found that when the amount of water was greater than or equal to 0.05 mass % and less than or equal to 1.0 mass %, in particular, efficiency of the anhydration step (manufacturing efficiency) and preservation stability, or curing properties and discharge stability (the suppression of the precipitation of the foreign substance) became excellent.

Hereinafter, second aspect of the invention will be described in detail by using examples and comparative examples. The invention is not limited to the following examples.

Material for Ultraviolet Curable Ink Composition for Ink Jet

A main material for an ink composition used in the following examples and comparative examples is as follows.

Color Material

P.I. Pigment Blue 15:4

Polymerizable Compound

VEEA (acrylic acid 2-(2-vinyloxyethoxy) ethyl, manufactured by Nippon Shokubai Co., Ltd., and the number of functional groups: 1)

PEA (phenoxy ethylacrylate, manufactured by Osaka Organic Chemical Industry Ltd., and the number of functional groups: 1)

DPGDA (dipropylene glycol diacrylate, manufactured by Sartomer Company, and the number of functional groups: 2)

SR444 (pentaerythritol triacrylate, manufactured by Nippon Kayaku Co., Ltd., and the number of functional groups: 3)

V#335HP (a product name "Viscoat#335HP", tetraethylene glycol diacrylate, manufactured by Osaka Organic Chemical Industry Ltd., and the number of functional groups: 2)

DVE-3 (triethylene glycol divinyl ether, manufactured by BASF Societas *Europaea*)

Polymerization Initiator

IRGACURE TPO (a trade name, manufactured by BASF Societas *Europaea*, and a solid content of 100 mass %)

IRGACURE 369 (a trade name, manufactured by BASF Societas *Europaea*, and a solid content of 100 mass %)

KAYACURE DETX (a trade name, manufactured by Nippon Kayaku Co., Ltd., and a solid content of 100 mass %)

Dispersing Agent

Solsperse 36000 (a trade name, manufactured by Noveon Inc.)

Polymerization Inhibitor

MEHQ (hydroquinone monomethyl ether, manufactured by Tokyo Chemical Industry Co., Ltd.)

Examples 1 to 9 and Comparative Examples 1 to 6

Preparation of Ink Composition

The respective materials were mixed at a composition (mass %) shown in the following Tables 4 and 5 and were sufficiently stirred, and thus each ink composition was obtained. Furthermore, each polymerizable compound used in each example and comparative example was distilled and purified one time or a plurality of times such that an amount of water in the ink composition became the amount shown in Tables 4 and 5, and was mixed with other materials.

TABLE 4

|  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| P.I. Pigment Blue 15:4 | 2.0 | 2.0 | 2.0 | 2.0 | 2.0 | 2.0 | 2.0 | 2.0 | 2.0 | 2.0 | 2.0 |
| Solsperse 36000 | 1.0 | 1.0 | 1.0 | 1.0 | 1.0 | 1.0 | 1.0 | 1.0 | 1.0 | 1.0 | 1.0 |
| VEEA | 20.0 | 20.0 | 20.0 | 20.0 | 20.0 | 5.0 | 10.0 | 30.0 | 50.0 | 70.0 | 75.0 |
| PEA | 35.0 | 35.0 | 35.0 | 35.0 | 35.0 | 50.0 | 45.0 | 25.0 | 5.0 | — | — |
| DPGDA | 22.0 | 22.0 | 22.0 | 22.0 | 22.0 | 22.0 | 22.0 | 22.0 | 22.0 | 7.0 | 2.0 |
| SR444 | 7.8 | 7.8 | 7.8 | 7.8 | 7.8 | 7.8 | 7.8 | 7.8 | 7.8 | 7.8 | 7.8 |
| MEHQ | 0.2 | 0.2 | 0.2 | 0.2 | 0.2 | 0.2 | 0.2 | 0.2 | 0.2 | 0.2 | 0.2 |
| Irgacure TPO | 4.0 | 4.0 | 4.0 | 4.0 | 4.0 | 4.0 | 4.0 | 4.0 | 4.0 | 4.0 | 4.0 |
| Irgacure 369 | 6.0 | 6.0 | 6.0 | 6.0 | 6.0 | 6.0 | 6.0 | 6.0 | 6.0 | 6.0 | 6.0 |
| KAYACURE DETX | 2.0 | 2.0 | 2.0 | 2.0 | 2.0 | 2.0 | 2.0 | 2.0 | 2.0 | 2.0 | 2.0 |
| Total | 100.0 | 100.0 | 100.0 | 100.0 | 100.0 | 100.0 | 100.0 | 100.0 | 100.0 | 100.0 | 100.0 |
| Amount of Water | 0.2% | 0.05% | 0.1% | 0.5% | 1.0% | 0.2% | 0.2% | 0.2% | 0.2% | 0.2% | 0.2% |
| Preservation Stability | A | A | A | A | A | A | A | A | A | B | B |
| Pigment Aggregation | A | A | A | A | B | A | A | A | A | A | A |
| Discharge Stability | A | B | A | A | B | A | A | A | A | A | A |
| Curing Properties | A | A | A | A | B | B | A | A | A | A | A |

TABLE 5

|  | Comparative Example 1 | Comparative Example 2 | Comparative Example 3 | Comparative Example 4 | Comparative Example 5 | Comparative Example 6 |
|---|---|---|---|---|---|---|
| P.I. Pigment Blue 15:4 | 2.0 | 2.0 | 2.0 | 2.0 | 2.0 | 2.0 |
| Solsperse 36000 | 1.0 | 1.0 | 1.0 | 1.0 | 1.0 | 1.0 |
| VEEA | — | — | — | 20.0 | 20.0 | — |
| TPGDA | 20.0 | — | — | — | — | — |
| V#335HP | — | 20.0 | — | — | — | — |
| DVE-3 | — | — | 20.0 | — | — | 20.0 |
| PEA | 35.0 | 35.0 | 35.0 | 35.0 | 35.0 | 35.0 |
| DPGDA | 22.0 | 22.0 | 22.0 | 22.0 | 22.0 | 22.0 |
| SR444 | 7.8 | 7.8 | 7.8 | 7.8 | 7.8 | 7.8 |
| MEHQ | 0.2 | 0.2 | 0.2 | 0.2 | 0.2 | 0.2 |

TABLE 5-continued

|  | Comparative Example 1 | Comparative Example 2 | Comparative Example 3 | Comparative Example 4 | Comparative Example 5 | Comparative Example 6 |
|---|---|---|---|---|---|---|
| Irgacure TPO | 4.0 | 4.0 | 4.0 | 4.0 | 4.0 | 4.0 |
| Irgacure 369 | 6.0 | 6.0 | 6.0 | 6.0 | 6.0 | 6.0 |
| KAYACURE DETX | 2.0 | 2.0 | 2.0 | 2.0 | 2.0 | 2.0 |
| Total | 100.0 | 100.0 | 100.0 | 100.0 | 100.0 | 100.0 |
| Amount of Water | 0.2% | 0.2% | 0.2% | 0.01% | 1.2% | 0.01% |
| Preservation Stability | A | A | C | A | A | A |
| Pigment Aggregation | A | A | A | A | C | A |
| Discharge Stability | A | A | A | C | C | A |
| Curing Properties | C | C | C | A | C | C |

Measurement of Amount of Water

An amount of water in the ink composition was measured by a moisture meter (manufactured by Hiranuma Sangyo Co., Ltd., a product name of "Automatic Heated and Vaporized Moisture Measurement System AQS-22010") using a Karl Fischer coulometry analysis. Results are shown in Tables 4 and 5 (a mass basis).

Evaluation of Preservation Stability

After the ink composition immediately after being prepared was stored in a glass bottle, the glass bottle was sealed and stored for five weeks at 50° C. A viscosity of the ink composition at 20° C. before and after keeping was measured by a viscoelasticity tester (a product name "MCR-30") manufactured by physica Ltd., and it was calculated that how much (%) the viscosity of the ink composition after keeping was increased from the viscosity of the ink composition before keeping, that is, how much (%) the viscosity of the ink composition after keeping was thickened from the viscosity of the ink composition before keeping. Results are shown in Tables 4 and 5.

A: Thickened by less than 5%.
B: Thickened by greater than or equal to 5% and less than 10%.
C: Thickened by greater than or equal to 10%.

Evaluation of Discharge Stability

A head including 360 nozzles was fixed to an upper portion, a PET film (commodity number "PET50 K2411 PAT1E", manufactured by Lintec Corporation) was transported to a lower portion of the nozzle of the head at 15 m/min, the ink composition was discharged onto the PET film from 180 nozzles at 10 kHz, and continuous printing was performed. Simultaneously with the printing, the ink composition attached to the PET film was irradiated with light of an LED having a light emitting wavelength peak of 395 nm, and thus an image was formed. It was visually confirmed whether or not the ink composition was discharged from the entire nozzle every 5 minutes from an initial discharge, and discharge stability was evaluated on the following evaluation reference. Results are shown in Tables 4 and 5. In addition, the ink composition was observed by an optical microscope, and it was confirmed the existence of pigment particles (a pigment aggregate) having a particle diameter greater than a normal particle diameter in the ink composition of which discharge stability was evaluated as C.

A: Nozzle coming-out did not occur for greater than or equal to 50 minutes.
B: Nozzle coming-out occurred for greater than or equal to 20 minutes and less than 50 minutes.
C: Nozzle coming-out occurred for less than 20 minutes.

Evaluation of Pigment Aggregation

After the ink composition immediately after being prepared was filtered by using filter paper (No. 5A, manufactured by Advantech Co., Ltd.), foreign substances remaining on the filter paper were visually observed. On the basis of the observation result, pigment aggregation was evaluated on the following evaluation reference.

A: Foreign substance was not confirmed.
B: Few foreign substances were confirmed.
C: Many foreign substances were confirmed.

Evaluation of Curing Properties

The ink composition was applied onto a PET film (PET50A PL Sin (a trade name), manufactured by Lintec Corporation) by using a bar coater, and a film having a thickness of 8 μm was formed. After that, the film was cured by being irradiated with ultraviolet ray having an irradiation intensity of 1100 mW/cm$^2$ and a wavelength of 395 nm. The film which was cured (the cured film) was rubbed with a cotton applicator at a weight of 100 g ten times, and curing energy (irradiation energy) at the time of being flawless was obtained.

Furthermore, the irradiation energy [mJ/cm$^2$] was obtained by measuring an irradiation intensity [mW/cm$^2$] of an irradiated surface emitted from the light source, and by calculating a product of the irradiation intensity and an irradiation continuing time [s]. The irradiation intensity was measured by using an ultraviolet ray intensity meter UM-10, and a light receiving unit UM-400 (manufactured by Konica Minolta Sensing, Inc.). On the basis of a result of the irradiation intensity, curing properties were evaluated on the following evaluation reference. Results are shown in Tables 4 and 5.

A: Less than or equal to 200 mJ/cm$^2$
B: Greater than 200 mJ/cm$^2$ and less than or equal to 300 mJ/cm$^2$
C: Greater than 300 mJ/cm$^2$ In addition, two films (a material: high density polyethylene, a plasticizing agent: diethyl adipate, and a thickness: 100 μm) were respectively cut out into the shape of rectangles having the same size, three sides of the rectangular films were heated and sealed, and a pack was prepared. The pack was filled with the ink composition of Example 1 or Comparative Example 1 by 700 mL, and the remaining sides of the rectangular films were heated and sealed, and thus the pack was sealed. An aluminum vapor deposited film (a thickness: 12 μm) was formed outside of the pack, and an aluminum vapor deposited pack filled with the ink composition was obtained. Furthermore, similar to the film described above, a moisture vapor transmission rate of a laminated film which is obtained by forming the aluminum vapor deposited film was measured as 0.5 g/m$^2$·24 hrs. In contrast, a pack filled with the ink composition of Example 1 or Comparative Example 1 was obtained by the same manner as that in the above description except that the aluminum vapor deposited film was not formed. Furthermore, a moisture vapor transmission rate of the film on which the aluminum vapor deposited film was not formed was measured as 35 g/m²·24 hrs.

A total of four packs were stored for six months under an environment of a temperature of 40° C. and relative humidity of 90%. An amount of water in the ink composition in the pack after keeping was measured, and only the amount of water exceeded 1 mass % in the pack filled with the ink composition of Example 1 in which the aluminum vapor deposited film was not formed. Thus, it was found that the moisture vapor transmission rate of the film configuring the pack was preferably less than or equal to 30 g/m²·24 hrs.

By comparing Examples 1 and 6 to 9 with Comparative Examples 1 to 3 and 6, it was found that when the ink composition includes VEEA, curing properties became particularly excellent. In addition, by comparing Examples 1 to 5 with Comparative Examples 4 and 5, it was found that when the amount of water was greater than or equal to 0.05 mass % and less than or equal to 1.0 mass %, in particular, discharge stability and preservation stability, or suppression of the pigment aggregation, discharge stability and curing properties became excellent.

Furthermore, according to a comparison between Comparative Example 4 and Comparative Example 6, it was found that when the ink composition did not include VEEA, preservation stability and discharge stability were not degraded even when the amount of water was less than or equal to 0.05 mass %. Further, in an ink composition prepared by the same manner as in Comparative Example except that a content of Irgacure TPO (a trade name) was changed to 9.0 mass % from 4.0 mass %, and a content of Irgacure 369 (a trade name) was changed to 1.0 mass % from 6.0 mass %, it was found that Solsperse 36000 (a trade name) which was a photopolymerization initiator was not easily dissolved.

The entire disclosure of Japanese Patent Application No. 2014-048222 filed Mar. 11, 2014, No. 2014-048223 filed Mar. 11, 2014, and No. 2014-083130 filed Apr. 14, 2014 are expressly incorporated by reference herein.

What is claimed is:

1. An ultraviolet curable ink jet composition which is stored in a storage body and comprises:
   a plurality of polymerizable compounds having a vinyl ether group and a (meth)acryloyl group;
   a photopolymerization initiator;
   a color material; and
   water,
   wherein an amount of the water is greater than or equal to 0.05 mass % and less than or equal to 1.0 mass % with respect to a total amount of the composition,
   wherein a total amount of the polymerizable compounds in the ultraviolet curable ink jet composition is greater than or equal to 35 mass % and less than or equal to 95 mass % with respect to a total amount of the ultraviolet curable ink jet composition,
   at least one of the polymerizable compounds has the following formula:

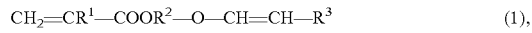

$$CH_2=CR^1-COOR^2-O-CH=CH-R^3 \qquad (1),$$

where $R^1$ is a hydrogen atom or a methyl group, $R^2$ is a bivalent organic residue having 2 to 20 carbon atoms, and $R^3$ is a hydrogen atom or a univalent organic residue having 1 to 11 carbon atoms,
   an amount of the compound represented by formula (1) is greater than or equal to 10 mass % and less than or equal to 30 mass % with respect to a total amount of the ultraviolet curable ink jet composition,
   an amount of the photopolymerization initiator is 5.0 mass % to 20 mass %,
   an amount of the color material is 0.5 mass % to 10 mass %, and
   the color material is a pigment.

* * * * *